United States Patent
Araki et al.

(10) Patent No.: US 8,940,813 B2
(45) Date of Patent: Jan. 27, 2015

(54) ACTINIC RADIATION-CURING TYPE INK COMPOSITION, INKJET RECORDING METHOD, DECORATIVE SHEET, DECORATIVE SHEET MOLDED PRODUCT, PROCESS FOR PRODUCING IN-MOLD MOLDED ARTICLE, AND IN-MOLD MOLDED ARTICLE

(71) Applicant: FUJIFILM Corporation, Tokyo (JP)

(72) Inventors: Kenjiro Araki, Kanagawa (JP); Atsushi Sakamoto, Kanagawa (JP); Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/797,630

(22) Filed: Mar. 12, 2013

(65) Prior Publication Data

US 2013/0260092 A1  Oct. 3, 2013

(30) Foreign Application Priority Data

Mar. 29, 2012 (JP) ................................. 2012-076678

(51) Int. Cl.
| | | |
|---|---|---|
| A61K 47/48 | (2006.01) |
| B29C 45/00 | (2006.01) |
| B29C 47/00 | (2006.01) |
| B32B 27/00 | (2006.01) |
| B32B 27/40 | (2006.01) |
| B32B 37/00 | (2006.01) |
| B41J 2/01 | (2006.01) |
| B41J 2/14 | (2006.01) |
| B41J 2/16 | (2006.01) |
| B41J 2/17 | (2006.01) |
| B41J 2/175 | (2006.01) |
| C03C 25/10 | (2006.01) |
| C08F 8/30 | (2006.01) |
| C08F 283/12 | (2006.01) |
| C08G 18/08 | (2006.01) |
| C08G 18/67 | (2006.01) |
| C08L 75/00 | (2006.01) |
| C08L 83/00 | (2006.01) |
| C08L 83/04 | (2006.01) |
| C09D 5/00 | (2006.01) |
| C09D 11/00 | (2014.01) |
| G01D 11/00 | (2006.01) |
| C09D 11/30 | (2014.01) |
| C09D 11/101 | (2014.01) |

(52) U.S. Cl.
CPC .............. *C09D 11/30* (2013.01); *C09D 11/101* (2013.01)
USPC ................. 523/160; 264/510; 347/1; 347/51; 347/52; 347/85; 347/95; 347/100; 347/102; 428/423.1; 428/500; 522/90; 522/91; 522/99; 522/172; 522/175; 523/161; 524/507; 524/588; 525/123; 525/455

(58) Field of Classification Search
USPC ........... 523/160, 161; 524/507, 588; 525/123, 525/455; 522/90, 91, 99, 172, 175; 347/1, 347/51, 52, 85, 95, 100, 102; 428/423.1, 428/500; 264/510
See application file for complete search history.

(56) References Cited

U.S. PATENT DOCUMENTS

| | | | |
|---|---|---|---|
| 6,534,128 B1 * | 3/2003 | Carlson et al. ................ 427/466 |
| 2008/0075882 A1 | 3/2008 | Hayata | |
| 2009/0041991 A1 | 2/2009 | Takano et al. | |
| 2012/0026235 A1 * | 2/2012 | Hayata ............................. 347/20 |

FOREIGN PATENT DOCUMENTS

| | | |
|---|---|---|
| JP | 2006-131884 A | 5/2006 |
| JP | 2008-105393 A | 5/2008 |
| JP | 2009-046605 A | 3/2009 |
| WO | 2007/097049 A1 | 8/2007 |

OTHER PUBLICATIONS

An Office Action; "Notice of Reasons for Rejection," issued by the Japanese Patent Office on Jun. 17, 2014, which corresponds to Japanese Patent Application No. 2013-051161 and is related to U.S. Appl. No. 13/797,630.

* cited by examiner

*Primary Examiner* — Patrick Niland
(74) *Attorney, Agent, or Firm* — Studebaker & Brackett PC

(57) ABSTRACT

Disclosed is an actinic radiation-curing type ink composition comprising (Component A) a monofunctional radically polymerizable monomer and (Component B) a polyfunctional acrylate oligomer having a glass transition temperature of no greater than 20° C. and having an acrylate equivalent of at least 300 g/eq, Component A comprising (Component A-1) an N-vinyl compound and (Component A-2) an acrylamide derivative, Component A having a content of at least 70 mass % of the entire ink composition, and Component A-1 having a content of at least 18 mass % of the entire ink composition.

20 Claims, No Drawings

ACTINIC RADIATION-CURING TYPE INK COMPOSITION, INKJET RECORDING METHOD, DECORATIVE SHEET, DECORATIVE SHEET MOLDED PRODUCT, PROCESS FOR PRODUCING IN-MOLD MOLDED ARTICLE, AND IN-MOLD MOLDED ARTICLE

CROSS-REFERENCE TO RELATED APPLICATION

This application claims priority under 35 USC 119 from Japanese Patent Application No. 2012-076678 filed on Mar. 29, 2012, the disclosure of which is incorporated by reference herein.

TECHNICAL FIELD

The present invention relates to an actinic radiation-curing type ink composition, an inkjet recording method, a decorative sheet, a decorative sheet molded product, a process for producing an in-mold molded article, and an in-mold molded article.

BACKGROUND ART

As image recording methods for forming an image on a recording medium such as paper based on an image data signal, there are an electrophotographic system, sublimation type and melt type thermal transfer systems, an inkjet system, etc.

With regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of recording media because, compared with a solvent-based ink composition, the drying properties are excellent and an image is resistant to spreading since the majority of the components in the ink composition cure upon exposure to radiation such as UV rays. Examples of conventional ink composition for inkjet recording are described in JP-A-2009-46605 (JP-A denotes a Japanese unexamined patent application publication) and JP-A-2006-131884.

SUMMARY OF INVENTION

It is an object of the present invention to provide an actinic radiation-curing type ink composition that can give an image having excellent stretchability and adhesion at high temperature, furthermore having excellent suitability for injection molding (resistance to ink flow) in in-mold molding in particular and, moreover, having suppressed cracking when punching, and to provide an inkjet recording method employing the actinic radiation-curing type ink composition, a decorative sheet, a decorative sheet molded product, a process for producing an in-mold molded article, and an in-mold molded article.

The object has been attained by means described in <1>, <17>, <19>, <20>, and <22> to <24>. They are described below together with <2> to <16>, <18>, and <21>, which are preferred embodiments.

<1> An actinic radiation-curing type ink composition comprising (Component A) a monofunctional radically polymerizable monomer and (Component B) a polyfunctional acrylate oligomer having a glass transition temperature of no greater than 20° C. and having an acrylate equivalent of at least 300 g/eq, Component A comprising (Component A-1) an N-vinyl compound and (Component A-2) an acrylamide derivative, Component A having a content of at least 70 mass % of the entire ink composition, and Component A-1 having a content of at least 18 mass % of the entire ink composition, <2> the actinic radiation-curing type ink composition according to <1>, wherein Component A-1 is a compound represented by Formula (A) below,

(A)

wherein in Formula (A), n denotes an integer of 2 to 6,

<3> the actinic radiation-curing type ink composition according to <1> or <2>, wherein Component A-2 has a content of 5 to 50 mass % of the entire ink composition, <4> the actinic radiation-curing type ink composition according to any one of <1> to <3>, wherein Component B has a content of 0.1 to 10 mass % of the entire ink composition, <5> the actinic radiation-curing type ink composition according to any one of <1> to <4>, wherein Component B has a content of 1 to 8 mass % of the entire ink composition, <6> the actinic radiation-curing type ink composition according to any one of <1> to <5>, wherein when the content of Component A-2 in 100 parts by mass of the ink composition is (a-2) (parts by mass) and the content of Component B is (b) (parts by mass), (a-2):(b) (mass ratio) is 30:1 to 1:1, <7> the actinic radiation-curing type ink composition according to any one of <1> to <6>, wherein it comprises (Component C) a polymerization initiator, Component C comprising (Component C-1) a thioxanthone compound, <8> the actinic radiation-curing type ink composition according to any one of <1> to <7>, wherein Component B is a difunctional acrylate oligomer, <9> the actinic radiation-curing type ink composition according to any one of <1> to <8>, wherein Component B has an isophorone structure, <10> the actinic radiation-curing type ink composition according to any one of <1> to <9>, wherein it further comprises (Component D) a difunctional monomer having a viscosity at 25° C. of no greater than 15 mPa·sec, <11> the actinic radiation-curing type ink composition according to <10>, wherein Component D is represented by Formula (d-1) below,

 (d-1)

wherein in Formula (d-1), A denotes a group selected from the group consisting of (A-1) to (A-3) below, A' denotes a group selected from the group consisting of (A'-1) to (A'-3) below, and B denotes a divalent linking group represented by Formula (B-1) or (B-2) below,

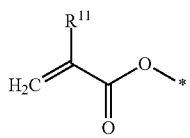 (A-1)

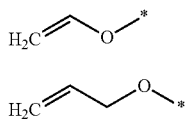 (A-2)

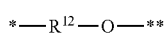 (A-3)

 (B-1)

*—(CHR$^{13}$CHR$^{14}$—O)$_n$—** (B-2)

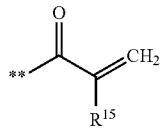 (A'-1)

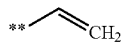 (A'-2)

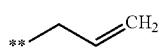 (A'-3)

wherein in Formula (A-1) $R^{11}$ denotes a hydrogen atom or a methyl group, in Formula (B-1) $R^{12}$ denotes a saturated hydrocarbon group having 2 to 12 carbons, in Formula (B-2) one of $R^{13}$ and $R^{14}$ denotes a hydrogen atom, the other denotes a hydrogen atom or a methyl group, and n denotes an integer of 2 to 10, in Formula (A'-1) $R^{15}$ denotes a hydrogen atom or a methyl group, * denotes the position of bonding between A and B, and ** denotes the position of bonding between B and A', <12> the actinic radiation-curing type ink composition according to <10> or <11>, wherein Component D is represented by Formula (d-2) below,

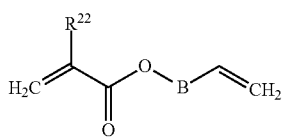 (d-2)

wherein in Formula (d-2), $R^{22}$ denotes a hydrogen atom or a methyl group and B denotes a group represented by Formula (B-1) or (B-2) below,

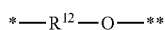 (B-1)

*—(CHR$^{13}$CHR$^{14}$—O)$_n$—** (B-2)

wherein in Formula (B-1) $R^{12}$ denotes a saturated hydrocarbon group having 2 to 12 carbons, in Formula (B-2) one of $R^{13}$ and $R^{14}$ denotes a hydrogen atom, the other denotes a hydrogen atom or a methyl group, n denotes an integer of 2 to 10, * denotes the position of bonding between the oxygen atom and B, and ** denotes the position of bonding between B and the vinyl group, <13> the actinic radiation-curing type ink composition according to any one of <1> to <12>, wherein Component A comprises (Component A-3) a compound represented by Formula (a-3) below,

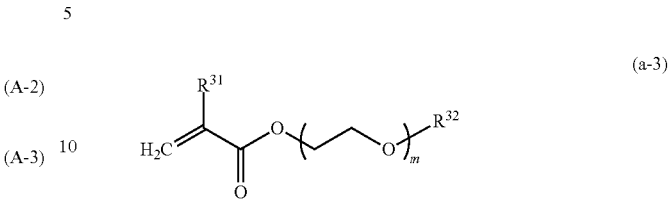 (a-3)

wherein in Formula (a-3), $R^{31}$ denotes a hydrogen atom or a methyl group, $R^{32}$ denotes a methyl group or an ethyl group, and m denotes an integer of 1 to 5, <14> the actinic radiation-curing type ink composition according to any one of <1> to <13>, wherein it comprises (Component E) a resin having a urethane bond in a main chain and having an ethylenically unsaturated group and a polysiloxane structure in a side chain and/or at a terminal, <15> the actinic radiation-curing type ink composition according to any one of <1> to <14>, wherein Component A-1 has a content relative to the entire ink composition of 18 to 45 mass %, <16> the actinic radiation-curing type ink composition according to any one of <1> to <15>, wherein it is for use in inkjet recording, <17> an inkjet recording method comprising ($a^1$) a step of discharging an ink composition onto a recording medium and ($b^1$) a step of irradiating the discharged ink composition with actinic radiation to thus cure the ink composition, the ink composition being the actinic radiation-curing type ink composition according to any one of <1> to <16>, <18> the inkjet recording method according to <17>, wherein the actinic radiation employs a light-emitting diode as a light source, <19> a decorative sheet comprising a cured image layer of the actinic radiation-curing type ink composition according to any one of <1> to <16> provided above a resin sheet, <20> a decorative sheet molded product obtained by vacuum forming, pressure forming, or vacuum/pressure forming of the decorative sheet according to <19>, <21> the decorative sheet molded product according to <20>, wherein it is further subjected to hole making by means of trimming subsequent to the vacuum forming, pressure forming, or vacuum/pressure forming, <22> a process for producing an in-mold molded article, comprising a step of placing the decorative sheet according to <19> or the decorative sheet molded product according to <20> or <21> on an inner wall of a hollow part formed from a plurality of molds and a step of injecting a molten resin into the hollow part via a gate, <23> an in-mold molded article obtained by the production process according to <22>, and <24> use of the composition according to any one of <1> to <16> as an actinic radiation-curing type ink for inkjet recording.

DESCRIPTION OF EMBODIMENTS

1. Ink Composition

The actinic radiation-curing type ink composition of the present invention (hereinafter, also simply called an 'ink composition' or 'ink') comprises (Component A) a monofunctional radically polymerizable monomer and (Component B) a polyfunctional acrylate oligomer having a glass transition temperature of no greater than 20° C. and having an acrylate equivalent of at least 300 g/eq, Component A comprising (Component A-1) an N-vinyl compound and (Component A-2) an acrylamide derivative, Component A having a content of at least 70 mass % of the entire ink composition, and Component A-1 having a content of at least 18 mass % of the entire ink composition.

The ink composition of the present invention may suitably be used as an ink composition for inkjet recording. Furthermore, the ink composition of the present invention may suitably be used in order to form an image layer of a decorative sheet that is subjected in particular to molding, punching, in-mold molding, etc.

In the present invention, the notation 'A to B', which expresses a numerical range, means 'at least A but no greater than B' unless otherwise specified. That is, it means a numerical range that includes A and B, which are end points. Furthermore, '(Component A) a monofunctional radically polymerizable monomer', etc., may simply be called 'Component A', etc.

In addition, 'mass %' and 'parts by mass' have the same meanings as 'wt %' and 'parts by weight' respectively. Moreover, in the present invention '(meth)acrylate' means both or either of 'acrylate' and 'methacrylate', and '(meth)acrylic' means both or either of 'acrylic' and 'methacrylic'. Similarly, '(meth)acrylamide' means both or either of 'acrylamide' and 'methacrylamide'.

Furthermore, in the chemical structural formulae in the present invention, a hydrocarbon chain may be expressed as a simplified structural formula in which symbols for carbon (C) and hydrogen (H) are omitted.

In the present invention, a combination of preferred embodiments is more preferable.

The present invention is explained in detail below.

The ink composition of the present invention is an oil-based ink composition that can be cured by actinic radiation. The 'actinic radiation' referred to here is radiation that can provide energy that enables an initiating species to be generated in the ink composition when irradiated, and includes α rays, γ rays, X rays, UV rays, visible light, and an electron beam. Among these, UV rays and an electron beam are preferable from the viewpoint of curing sensitivity and the availability of equipment, and UV rays are more preferable. The ink composition of the present invention is therefore preferably an ink composition that is curable upon exposure to UV rays as actinic radiation.

An ink composition that is applied to a print sheet that is subjected to molding (decorative sheet) is required to have a high level of cured film flexibility since a film of the ink is stretched during molding. Furthermore, a cured film strength that can withstand molding is also required.

An ink film (image) obtained from a conventional actinic radiation-curing type ink composition has the problem that, due to insufficient film strength, scratches or white spots occur in the image when molding or, due to lack of resistance to stretching, cracking or peeling off from a substrate occurs.

Furthermore, in recent years, when used in insert molding, in which a decorative sheet molded article is placed within a cavity of a mold and a molten resin is injected to fuse and integrate the decorative sheet molded article and a resin molding formed from the molten resin, in the case of an image layer being formed on the surface on the molten resin side, there is the problem that the injection of molten resin causes ink of the image layer to flow. On the other hand, in the case of the resin molding formed from molten resin being fused to the substrate side, there is the problem that the image layer sticks to the mold.

As a result of an intensive investigation by the present inventors, it has been found that the above problems can be solved by the use of an ink composition comprising Component A-1, Component A-2, and Component B in specific proportions, and the present invention has been accomplished.

Although the mechanism is not clear, it is thought that due to Component A-1 and Component A-2 being contained, the adhesion to a substrate and stretchability at high temperature of an image that is obtained improve. Furthermore, it is thought that due to Component B being further contained, the heat resistance is improved while the above performance characteristics are maintained.

The ink composition of the present invention is explained in detail below.

(Component A) Monofunctional Radically Polymerizable Monomer

The ink composition of the present invention comprises (Component A) a monofunctional radically polymerizable monomer. Furthermore, it comprises, as the monofunctional radically polymerizable monomer (Component A), (Component A-1) an N-vinyl compound and (Component A-2) an acrylamide derivative.

The monofunctional radically polymerizable monomer referred to here means a compound having only one radically polymerizable ethylenically unsaturated bond and having a molecular weight of no greater than 500.

Preferred examples of polymerizable groups comprising a radically polymerizable ethylenically unsaturated group include a (meth)acryloyloxy group, a (meth)acrylamide group, a vinyloxy group, an allyloxy group, and an N-vinyl group.

The ink composition of the present invention comprises Component A at a content of at least 70 mass % of the entire ink composition. When the content of the monofunctional radically polymerizable monomer is less than 70 mass %, it is difficult to obtain an image having excellent stretchability.

The content of Component A is preferably 70 to 95 mass % of the entire ink composition, more preferably 72 to 92 mass %, and yet more preferably 75 to 90 mass %.

(Component A-1) N-Vinyl Compound

The ink composition of the present invention comprises, as the monofunctional radically polymerizable monomer (Component A), (Component A-1) an N-vinyl compound. The N-vinyl compound is preferably an N-vinyllactam, and more preferably a compound represented by Formula (A).

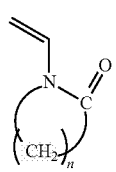

(A)

In Formula (A), n denotes an integer of 2 to 6; n is preferably an integer of 3 to 5 from the viewpoint of flexibility after the ink composition is cured, adhesion to a recording medium, and ready availability of starting materials, n is more preferably 3 or 5, and n is particularly preferably 5, which is N-vinylcaprolactam. N-vinylcaprolactam is preferable since it has excellent safety, is commonly used and is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring.

Component A-1 may be used singly or in a combination of two or more compounds.

The ink composition of the present invention comprises Component A-1 at a content of at least 18 mass % relative to the total mass of the ink composition. When the content is less than 18 mass %, an image that is obtained has poor adhesion to a substrate, stretchability, and ink flow resistance.

The content of Component A-1 is preferably 18 to 45 mass %, more preferably 20 to 40 mass %, and yet more preferably 20 to 35 mass %. When the content of Component A-1 is in the above range, an ink composition that can give an image having excellent adhesion, stretchability, and ink flow resistance is obtained.

(Component A-2) Acrylamide Derivative

The ink composition of the present invention comprises, as the monofunctional radically polymerizable monomer (Component A), (Component A-2) an acrylamide derivative. Due to Component A-2 being contained, the adhesion to substrate and stretchability of an image at high temperature improve.

Component A-2 is preferably a compound represented by Formula (a-2-1) below.

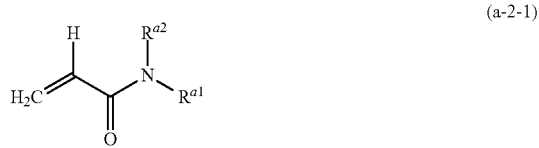

(a-2-1)

(In Formula (a-2-1), $R^{a1}$ and $R^{a2}$ independently denote a hydrogen atom or an alkyl group having 1 to 12 carbons, $R^{a1}$ and $R^{a2}$ may be bonded to form an alkylene group having 4 to 8 carbons, a hydrogen atom contained in the alkyl group or the alkylene group may be replaced by a hydroxy group, a methylene group contained in the alkyl group or the alkylene group may be replaced by an oxygen atom, a sulfur atom, —CO—, or —NR$^{a3}$—, and R$^{a3}$ denotes a hydrogen atom or an alkyl group having 1 to 6 carbons.)

In Formula (a-2-1), $R^{a1}$ and $R^{a2}$ independently denote a hydrogen atom or an alkyl group having 1 to 12 carbons, preferably 1 to 8 carbons, and more preferably 1 to 6 carbons. $R^{a1}$ and $R^{a2}$ may be bonded to form an alkylene group having 4 to 8 carbons, and preferably an alkylene group having 4 to 6 carbons. A hydrogen atom contained in the alkyl group or the alkylene group may be replaced by a hydroxy group, and a methylene group contained in the alkyl group or the alkylene group may be replaced by an oxygen atom, a sulfur atom, —CO—, or —NR$^{a3}$—. The alkyl group having 1 to 12 carbons may be straight-chain, branched, or cyclic, and is preferably straight-chain or branched. $R^{a3}$ denotes a hydrogen atom or an alkyl group having 1 to 6 carbons; the alkyl group having 1 to 6 carbons may be straight-chain, branched, or cyclic, but is preferably straight-chain or cyclic.

Specific examples of the acrylamide derivative include acrylamide, N-methylacrylamide, N-ethylacrylamide, N-isopropylacrylamide, N-t-butylacrylamide, N-hexylacrylamide, N-cyclohexylacrylamide, N-dodecylacrylamide, N,N-dimethylacrylamide, N,N-diethylacrylamide, N,N-dipropylacrylamide, N,N-dibutylacrylamide, N,N-dihexylacrylamide, acryloylmorpholine, N-(hydroxymethyl)acrylamide, N-(2-hydroxyethyl)acrylamide, N-isobutoxymethylacrylamide, N-(3-dimethylaminopropyl)acrylamide, N-(1,1-dimethyl-3-oxobutyl)acrylamide, diacetone acrylamide, N,N-butoxymethylacrylamide, N,N-dimethylaminomethylacrylamide, N,N-dimethylaminoethylacrylamide, N,N-dimethylaminopropylacrylamide, N,N-dimethylaminohexylacrylamide, N,N-diethylaminomethylacrylamide, N,N-diethylaminoethylacrylamide, N,N-diethylaminopropylacrylamide, and N,N-diethylaminohexyl(meth)acrylamide.

Among them, in the present invention, the acrylamide derivative is preferably N,N-dimethylacrylamide, N,N-diethylacrylamide, N-isopropylacrylamide, or acryloylmorpholine, and is more preferably N-isopropylacrylamide or acryloylmorpholine.

In the present invention, with regard to Component A-2, one type may be used on its own or a plurality of types may be used in combination.

In the present invention, the content of Component A-2 relative to the entire ink composition is preferably 0.1 to 70 mass %, more preferably 5 to 50 mass %, yet more preferably 10 to 30 mass %, and particularly preferably 12 to 25 mass %.

It is preferable for the content of Component A-2 to be in the above range since the stretchability and adhesion of an image at high temperature are excellent.

(Component A-3) Compound Represented by Formula (a-3)

The ink composition of the present invention preferably further comprises, as the monofunctional radically polymerizable monomer (Component A), (Component A-3) a compound represented by Formula (a-3) below. It is preferable for Component A-3 to be contained since excellent viscosity suitability for inkjet recording is obtained and the adhesion and stretchability are excellent.

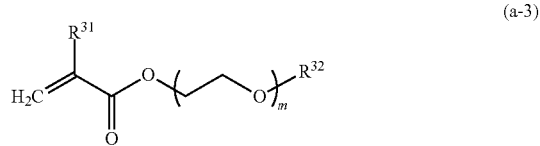

(a-3)

(In Formula (a-3), $R^{31}$ denotes a hydrogen atom or a methyl group, $R^{32}$ denotes a methyl group or an ethyl group, and m denotes an integer of 1 to 5.)

In Formula (a-3), $R^{31}$ denotes a hydrogen atom or a methyl group and is preferably a hydrogen atom.

$R^{32}$ denotes a methyl group or an ethyl group and is preferably an ethyl group.

m denotes an integer of 1 to 5 and is preferably an integer of 2 to 4.

Specific examples of Component A-3 include ethoxyethyl (meth)acrylate, ethoxyethoxyethyl (meth)acrylate, and methoxyethyl (meth)acrylate; among them ethoxyethoxyethyl (meth)acrylate is preferable, and ethoxyethoxyethyl acrylate is particularly preferable.

The ink composition of the present invention may use one type of Component A-3 on its own or a plurality of types thereof in combination.

From the viewpoint of viscosity suitability, adhesion, and stretchability, the content of Component A-3 relative to the entire ink composition is preferably 0.3 to 20 mass %, more preferably 1 to 15 mass %, and yet more preferably 3 to 10 mass %.

(Component A-4) Other Monofunctional Radically Polymerizable Monomer

The ink composition of the present invention may comprise as the monofunctional radically polymerizable monomer (Component A), in addition to Component A-1 to Component A-3, (Component A-4) another monofunctional radically polymerizable monomer.

(Component A-4-1) Monofunctional (meth)acrylate Monomer Having Aromatic Group

In the present invention, as the other monofunctional radically polymerizable monomer (Component A-4), (Component A-4-1) a monofunctional (meth)acrylate monomer having an aromatic group may preferably be used. The aromatic group ring structure of the monofunctional (meth)acrylate monomer having an aromatic group may comprise a heteroatom such as O, N, or S.

Component A-4-1 is preferably a compound represented by Formula (a-4-1) below.

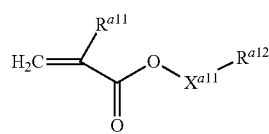

(a-4-1)

In Formula (a-4-1), $R^{a11}$ denotes a hydrogen atom or a methyl group.

$X^{a11}$ denotes a single bond, an ether bond (—O—), an ester bond (—C(O)O— or —OC(O)—), an amide bond (—C(O)NH—, or —NHC(O)—), a carbonyl bond (—C(O)—), an optionally branched alkylene group having no greater than 20 carbons, or a linking group formed by combining the above, and is preferably a single bond or one comprising a group or bond selected from the group consisting of an ether bond, an ester bond, and an alkylene group having no greater than 20 carbons.

$R^{a12}$ denotes an aromatic group such as a monocyclic aromatic group or a polycyclic aromatic group, and the aromatic group ring structure may comprise a heteroatom such as O, N, or S.

Preferable examples of the aromatic group denoted by $R^{12}$ include a phenyl group, which is a monocyclic aromatic group, or a polycyclic aromatic group having 2 to 4 rings.

Specific examples of the polycyclic aromatic group include a naphthyl group, an anthryl group, a 1H-indenyl group, a 9H-fluorenyl group, a 1H-phenalenyl group, a phenanthrenyl group, a triphenylenyl group, a pyrenyl group, a naphthacenyl group, a tetraphenylenyl group, a biphenylenyl group, an as-indacenyl group, an s-indacenyl group, an acenaphthylenyl group, a fluoranthenyl group, an acephenanthrenyl group, an aceanthrenyl group, a chrysenyl group, and a pleiadenyl group. In the present invention, the phenyl group is preferable.

These aromatic groups may be aromatic heterocyclic groups containing a heteroatom such as O, N, or S. Specific examples thereof include monocyclic aromatic heterocyclic groups such as a furyl group, a thienyl group, a 1H-pyrrolyl group, a 2H-pyrrolyl group, a 1H-pyrazolyl group, a 1H-imidazolyl group, an isooxazolyl group, an isothiazolyl group, a pyridyl group, a pyridazinyl group, a pyrimidinyl group, a pyrazinyl group, a triazolyl group, and a tetrazolyl group.

Examples further include polycyclic aromatic heterocyclic groups such as a thianthrenyl group, a benzofuranyl group, an isobenzofuranyl group, a chromenyl group, an isochromenyl group, a xanthenyl group, a phenoxathiinyl group, an indolizinyl group, an isoindolyl group, an indolyl group, an indazolyl group, a purinyl group, a quinolizinyl group, an isoquinolyl group, a quinolyl group, a phthalazinyl group, a naphthyridinyl group, a quinoxalinyl group, a quinazolinyl group, a cinnolinyl group, a pteridinyl group, a carbazolyl group, a β-carbolinyl group, a phenanthridinyl group, an acridinyl group, a perimidinyl group, a phenanthrolinyl group, a phenazinyl group, a phenothiazinyl group, a phenoxazinyl group, and a pyrrolizinyl group.

The aromatic group may have one or more substituents such as a halogen atom, a hydroxyl group, an amino group, a thiol group, a siloxane group, or a hydrocarbon group having no greater than 30 carbons. Two or more substituents of the aromatic group may form a ring structure containing a heteroatom such as O, N, or S as in, for example, phthalic anhydride or phthalimide.

Among them, as the aromatic group-containing monofunctional (meth)acrylate, phenoxyethyl (meth)acrylate is particularly preferable, and phenoxyethyl acrylate is most preferable.

The content of Component A-4-1 relative to the entire ink composition is preferably 10 to 50 mass %, more preferably 15 to 45 mass %, and yet more preferably 20 to 40 mass %. It is preferable for the content to be in this range since a printed material that is obtained has excellent stretchability and adhesion.

(Component A-4-2) Compound Represented by Formula (a-4-2)

From the viewpoint of adhesion to a substrate and stretchability of a cured film that is obtained, the ink composition of the present invention may comprise as Component A-4 (Component A-4-2) a compound represented by Formula (a-4-2).

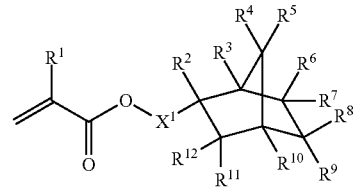

(a-4-2)

(In Formula (a-4-2), $R^1$ denotes a hydrogen atom or a methyl group, $X^1$ denotes a single bond or a divalent linking group, and $R^2$ to $R^{12}$ independently denote a hydrogen atom or an alkyl group.)

The compound represented by Formula (a-4-2) may be an acrylate compound or a methacrylate compound, but is preferably an acrylate compound, that is, $R^1$ is a hydrogen atom.

The divalent linking group denoted by $X^1$ in Formula (a-4-2) is not particularly limited as long as the effects of the present Invention are not greatly impaired; it is preferably a divalent hydrocarbon group or a divalent group in which a hydrocarbon group and an ether bond are combined, and is more preferably a divalent hydrocarbon group, a poly(alkyleneoxy) group, or a poly(alkyleneoxy)alkyl group. Furthermore, the number of carbons of the divalent linking group is preferably 1 to 60, and more preferably 1 to 40.

$X^1$ in Formula (a-4-2) is preferably a single bond, a divalent hydrocarbon group, or a divalent group in which a hydrocarbon group and an ether bond are combined, more preferably a single bond or a divalent hydrocarbon group, and particularly preferably a single bond.

The alkyl group denoted by $R^2$ to $R^{12}$ in Formula (a-4-2) is preferably an alkyl group having 1 to 8 carbons, more preferably an alkyl group having 1 to 4 carbons, and particularly preferably a methyl group. Furthermore, the alkyl group denoted by $R^2$ to $R^{12}$ may have a straight chain, branched, or ring structure.

It is preferable that $R^2$ to $R^{12}$ in Formula (a-4-2) are independently a hydrogen atom or an alkyl group having 1 to 8 carbons, more preferably a hydrogen atom or an alkyl group having 1 to 4 carbons, and yet more preferably a hydrogen atom or a methyl group.

Furthermore, it is particularly preferable that $R^2$ to $R^{12}$ in Formula (a-4-2) are all hydrogen atoms or $R^3$ to $R^5$ are methyl groups and $R^2$ and $R^6$ to $R^{12}$ are hydrogen atoms, and it is most preferable that $R^3$ to $R^5$ are methyl groups and $R^2$ and $R^6$ to $R^{12}$ are hydrogen atoms.

Specific examples of compounds represented by Formula (a-4-2) include, but of course are not limited to, compounds (a-4-2(1)) to (a-4-2(6)) shown below.

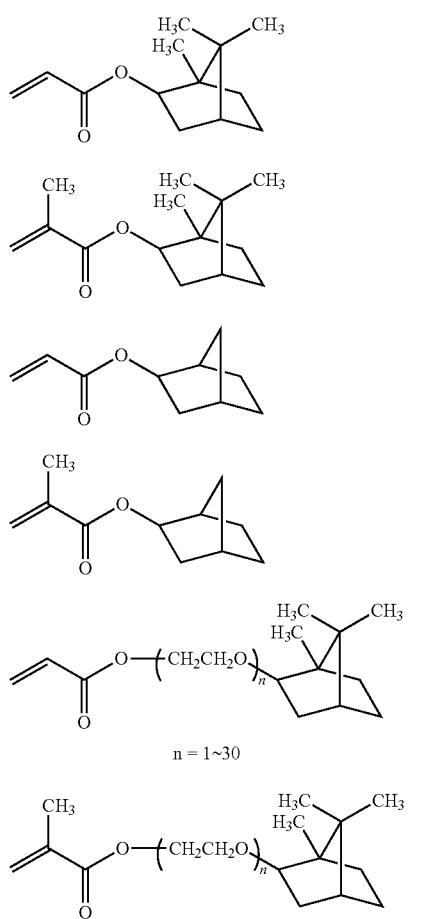

Among them, isobornyl acrylate (a-4-2(1)), isobornyl methacrylate (a-4-2(2)), norbornyl acrylate (a-4-2(3)), and norbornyl methacrylate (a-4-2(4)) are preferable, isobornyl acrylate (a-4-2(1)) and isobornyl methacrylate (a-4-2(2)) are more preferable, and isobornyl acrylate (a-4-2(1)) is particularly preferable.

The content of Component A-4-2 relative to the entire ink composition is preferably 0.1 to 25 mass %, more preferably 1 to 20 mass %, and yet more preferably 5 to 15 mass %. It is preferable for the content to be in this range since the viscosity suitability is excellent and a printed material that is obtained has good stretchability.

(Component A-4-3) Other Monofunctional (meth)acrylate Monomer

As another monofunctional (meth)acrylate monomer, a (meth)acrylate monomer having a chain-form hydrocarbon group having 8 to 13 carbons may be contained. The chain-form hydrocarbon group may be a straight-chain hydrocarbon group or a branched chain hydrocarbon group.

The (meth)acrylate compound having a chain-form hydrocarbon group having 8 to 13 carbons is preferably a (meth)acrylic acid ester of a chain-form hydrocarbon monoalcohol having 8 to 13 carbons, and more preferably a (meth)acrylic acid ester of a chain-form hydrocarbon monoalcohol having 10 to 13 carbons.

Specific examples include octyl (meth)acrylate, isooctyl (meth)acrylate, nonyl (meth)acrylate, decyl (meth)acrylate, isodecyl (meth)acrylate, lauryl (meth)acrylate, and tridecyl (meth)acrylate.

Examples of other monofunctional (meth)acrylate monomer include 2-ethylhexyl(meth)acrylate, 2-hydroxyethyl (meth)acrylate, butoxyethyl(meth)acrylate, carbitol (meth)acrylate, cyclohexyl (meth)acrylate, tetrahydrofurfuryl (meth)acrylate, benzyl (meth)acrylate, methyl (meth)acrylate, n-butyl (meth)acrylate, allyl (meth)acrylate, glycidyl (meth)acrylate, dimethylaminomethyl (meth)acrylate, epoxy (meth)acrylate, and cyclic trimethylolpropane formal (meth)acrylate.

(Component B) Polyfunctional Acrylate Oligomer Having Glass Transition Temperature of No Greater than 20° C. and Having Acrylate Equivalent of at Least 300 g/eq The ink composition of the present invention comprises (Component B) a polyfunctional acrylate oligomer having a glass transition temperature of no greater than 20° C. and having an acrylate equivalent of at least 300 g/eq. Due to Component B being contained, the heat resistance is improved while the high stretchability of an image that is obtained is maintained.

An oligomer is generally a polymer in which a limited number (in general 5 to 100) of monomers are bonded, and in the present invention it is a compound having a weight-average molecular weight of greater than 500 but no greater than 15,000. The weight-average molecular weight is preferably 750 to 13,000, more preferably 1,000 to 12,000, and yet more preferably 1,100 to 11,000.

With regard to Component B, the glass transition temperature of no greater than 20° C. referred to here means the glass transition temperature of a homopolymer of Component B and is measured by a dynamic mechanical analysis (DMA). The glass transition temperature of a homopolymer might depend on the degree of polymerization, but the influence of the degree of polymerization can be ignored if a homopolymer having a weight-average molecular weight of at least 10,000 is produced and measured.

More specifically, 5 parts by mass of 2,4,6-trimethylbenzoyldiphenylphosphine oxide (TPO) is dissolved as a polymerization initiator in 100 parts by mass of Component B, and this is applied at a film thickness of 100 μm and irradiated with UV light of 2,000 mW/cm$^2$ and 10 mJ/cm$^2$ to thus produce a cured film. This film is measured using a dynamic viscoelastometer (DMA) from −20° C. to 200° C., and the temperature at which a glass transition occurs is defined as the glass transition temperature (Tg) of the oligomer.

The glass transition temperature of Component B is no greater than 20° C., preferably no greater than 18° C., more preferably no greater than 15° C., yet more preferably no greater than 10° C., and particularly preferably no greater than 0° C. Furthermore, the lower limit of the glass transition temperature is not particularly limited, but it is preferably −60° C. or above, more preferably −50° C. or above, and yet more preferably −40° C. or above.

When Component B has a glass transition temperature of no greater than 20° C., the suitability for punching is excellent. When it is −60° C. or above, the ink flow suitability is excellent.

Component B has an acrylate equivalent of at least 300 g/eq. The 'acrylate equivalent' referred to here is that obtained by dividing the weight-average molecular weight by the average number of acrylate groups per molecule and is given by the equation below.

Acrylate equivalent=(weight-average molecular weight)/(average number of acrylate groups per molecule)

From the viewpoint of a balance being achieved between stretchability and resistance to ink flow, the acrylate equivalent of Component B is at least 300 g/eq.

The acrylate equivalent of Component B is at least 300 g/eq, preferably at least 600 g/eq, and more preferably at least 800 g/eq. The upper limit of the acrylate equivalent is not particularly limited, but it is preferably no greater than 20,000 g/eq, more preferably no greater than 10,000 g/eq, and yet more preferably no greater than 8,000 g/eq. When the acrylate equivalent of Component B is no greater than 20,000 g/eq, the stretchability is excellent.

In the present invention, the number of functional groups (acrylate groups) per molecule of Component B is preferably 2 to 6, more preferably 2 to 4, yet more preferably 2 or 3, and most preferably 2.

The polyfunctional acrylate oligomer in the present invention is preferably an oligoester acrylate; among them, a urethane acrylate oligomer, a polyester acrylate oligomer, and an epoxy acrylate oligomer are more preferable, and a urethane acrylate oligomer is yet more preferable.

Preferred examples of the urethane acrylate oligomer include an aliphatic urethane acrylate oligomer and an aromatic urethane acrylate oligomer, and an aliphatic urethane acrylate oligomer is more preferable.

The urethane acrylate oligomer is preferably a tetra- or lower-functional urethane acrylate oligomer, and is more preferably a difunctional urethane acrylate oligomer.

Due to a urethane acrylate oligomer being contained, an ink composition having excellent adhesion to a substrate and excellent curability is obtained.

With regard to Component B, the 'Oligomer Handbook' (Ed. by Junji Furukawa, The Chemical Daily Co., Ltd.) may also be referred to.

In the present invention, Component B preferably has a partial structure containing an isophorone structure represented by Formula (B-1) below.

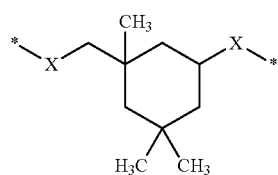

(B-1)

In Formula (B-1), the Xs independently denote a urethane bond, an ester bond, an ethyleneoxy (EO) group, a propyleneoxy (PO) group, or an alkylene group, and * denotes a bonding position.

In Formula (B-1), X denotes a urethane bond (—NH—CO—O—), an ester bond (—CO—O—), an ethyleneoxy (EO) group, a propyleneoxy (PO) group, or an alkylene group. The alkylene group preferably has 1 to 12 carbons, more preferably 1 to 8 carbons, yet more preferably 1 to 6 carbons, and particularly preferably 1 to 4 carbons.

Among them, X is preferably a urethane bond. That is, Component B preferably has a partial structure containing a urethane bond and an isophorone structure represented by Formula (B-1').

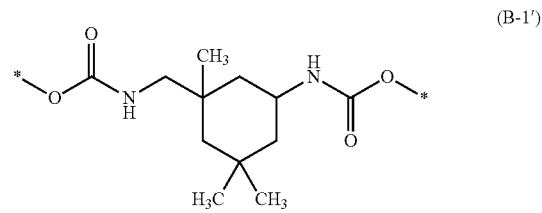 [SMILES: *OC(=O)NCC1(C)CC(NC(=O)O*)CC(C)(C)C1]

(B-1')

In Formula (B-1'), * denotes a bonding position.

Component B yet more preferably has a partial structure represented by Formula (B-2).

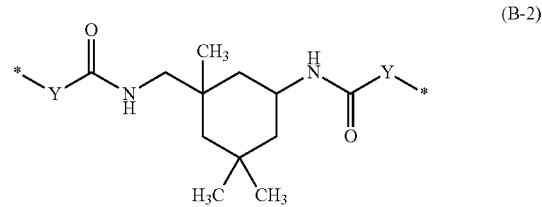

(B-2)

In Formula (B-2), Ys independently denote an ester bond, an ether bond, a carbonyl group, an alkylene group, or a group formed by combining two or more thereof, and * denotes a bonding position.

Y denotes an ester bond (—CO—O—), an ether bond (—O—), a carbonyl group (—CO—), an alkylene group, or a group formed by combining two or more thereof. The alkylene group may be any of straight-chain, branched, and cyclic, and the number of carbons is preferably 1 to 24, more preferably 2 to 20, yet more preferably 2 to 16, and particularly preferably 2 to 12.

When Y is a group formed by combining at least two of an ester bond, an ether bond, a carbonyl group (—CO—), and an alkylene group, examples include an alkyleneoxy group (an ethyleneoxy group, a propyleneoxy group), and a poly(alkyleneoxy) group.

Among them, Y preferably contains a group represented by Formula (Y-1) to Formula (Y-5) below or a group formed by combining two or more thereof.

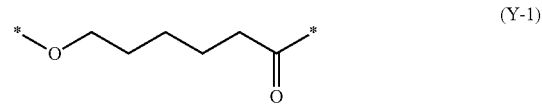

(Y-1)

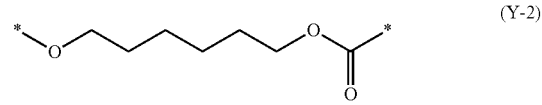

(Y-2)

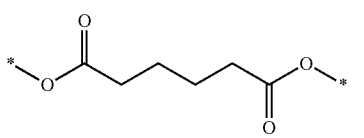
(Y-3)

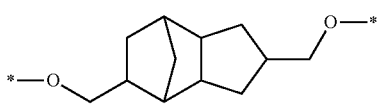
(Y-4)

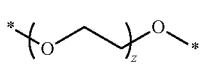
(Y-5)

(In the Formula, z denotes an integer of 1 to 100.)

Furthermore, Component B preferably has a (meth)acrylate group at a terminal, and more preferably a group represented by Formula (B-3) below at a terminal.

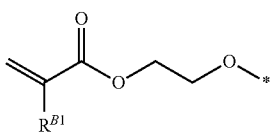
(B-3)

In Formula (B-3), $R^{B1}$ denotes a hydrogen atom, and * denotes the position of bonding to another structure.

Component B is preferably a straight-chain difunctional oligomer.

Furthermore, a monomer unit having an isophorone structure in the urethane acrylate oligomer having an isophorone structure is preferably 1 to 30 mol % relative to the total monomer units forming the oligomer, more preferably 2 to 28 mol %, and yet more preferably 3 to 25 mol %.

Examples of commercially available polyfunctional acrylate oligomer products include those below.

Examples of the urethane acrylate oligomer include the EBECRYL series manufactured by Daicel-Cytec Company Ltd. (e.g. EBECRYL 210 (acrylate equivalent: 750 g/eq, Tg≤20° C.), 230 (acrylate equivalent: 2,500 g/eq, Tg=−55° C.), 244 (acrylate equivalent: 1,000 g/eq, Tg≤20° C.), 270 (acrylate equivalent: 750 g/eq, Tg=−27° C.), 4858 (acrylate equivalent: 300 g/eq, Tg≤20° C.), 8402 (acrylate equivalent: 500 g/eq, Tg=14° C.), and 9270 (acrylate equivalent: 500 g/eq, Tg≤20° C.)), U-200PA (acrylate equivalent: 1,300 g/eq, Tg≤20° C.), UA122P (acrylate equivalent: 550 g/eq, Tg≤20° C.), UA160TM (acrylate equivalent: 1,000 g/eq, Tg≤20° C.), U108A (acrylate equivalent: 800 g/eq, Tg≤20° C.), etc. manufactured by Shin-Nakamura Chemical Co., Ltd., UV2000B (acrylate equivalent: 6,500 g/eq, Tg=−38° C.), UV3000B (acrylate equivalent: 9,000 g/eq, Tg=−39° C.), UV3200B (acrylate equivalent: 5,000 g/eq, Tg=−8° C.), UV3300B (acrylate equivalent: 6,500 g/eq, Tg=−30° C.), and UV3700B (acrylate equivalent: 19,000 g/eq, Tg=−6° C.) manufactured by The Nippon Synthetic Chemical Industry Co., Ltd., and C9007 (acrylate equivalent: 2,250 g/eq, Tg=1° C.), etc. manufactured by Sartomer Company Inc.

Examples of the polyester acrylate oligomer include the EBECRYL series manufactured by Daicel-Cytec Company Ltd. (e.g. EBECRYL 812 (acrylate equivalent: 400 g/eq, Tg≤20° C.), 853 (acrylate equivalent: 300 g/eq, Tg≤20° C.), 884 (acrylate equivalent: 1,500 g/eq, Tg≤20° C.), etc.).

Examples of the epoxy acrylate include the EBECRYL series manufactured by Daicel-Cytec Company Ltd. (e.g. EBECRYL 3708 (acrylate equivalent: 750 g/eq, Tg≤20° C.), etc.).

In the present invention, with regard to Component B, one type may be used on its own or two or more types may be used in combination.

The content of Component B relative to the entire ink composition is preferably 0.1 to 10 mass %, and more preferably 3 to 7 mass %.

It is preferable for the content of Component B to be in this range since a balance can be achieved between punching suitability, stretchability, and resistance to ink flow.

In the present invention, other oligomers such as a polyfunctional acrylate oligomer having a glass transition temperature of more than 20° C., a polyfunctional acrylate oligomer having an acrylate equivalent of less than 300 g/eq, and a monofunctional acrylate oligomer are not excluded from the ink composition, but the content of these other oligomers is preferably no greater than 5 mass % of the entire ink composition, more preferably no greater than 3 mass %, yet more preferably no greater than 1 mass %, and particularly preferably none.

In the present invention, when the content of the acrylamide derivative (Component A-2) in 100 parts by mass of the ink composition is (a-2) (parts by mass), and the content of the polyfunctional acrylate oligomer (Component B) is (b) (parts by mass), then (a-2):(b) (mass ratio) is preferably 30:1 to 1:1, more preferably 15:1 to 1.5:1, and yet more preferably 10:1 to 2:1.

It is preferable for (a-2):(b) to be no greater than 30:1 since the resistance to ink flow is excellent and cracking when carrying out a punching test is suppressed. It is also preferable for (a-2):(b) to be at least 1:1 since the stretchability and adhesion of an image to a substrate are excellent.

(Component C) Polymerization Initiator

The ink composition of the present invention preferably comprises (Component C) a polymerization initiator. Furthermore, it preferably comprises (Component C-1) a thioxanthone compound as Component C.

The polymerization initiator in the present invention includes not only a compound that generates a polymerization initiating species by absorbing external energy such as actinic radiation but also a compound that promotes decomposition of a polymerization initiator by absorbing specific actinic radiation (a so-called sensitizer). It also includes a compound having a function of enhancing the efficiency of generation of polymerization initiator radicals (a so-called co-initiator).

(Component C-1) Thioxanthone Compound

The ink composition of the present invention preferably comprises, as the polymerization initiator (Component C), (Component C-1) a thioxanthone compound. Due to a thioxanthone compound being contained, the curability is excellent.

The thioxanthone compound is not particularly limited; a known compound may be used, and a compound represented by Formula (C-1) below is preferable.

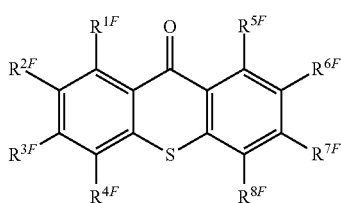

(C-1)

In Formula (C-1) above, $R^{1F}$, $R^{2F}$, $R^{3F}$, $R^{4F}$, $R^{5F}$, $R^{6F}$, $R^{7F}$, and $R^{8F}$ independently denote a hydrogen atom, an alkyl group, a halogen atom, a hydroxy group, a cyano group, a nitro group, an amino group, an alkylthio group, an alkylamino group (The alkylamino group includes the case of monoalkylsubstituted amino group and dialkylsubstituted amino group. It is same also in the following.), an alkoxy group, an alkoxycarbonyl group, an acyloxy group, an acyl group, a carboxy group, or a sulfo group. The number of carbon atoms of an alkyl moiety in the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{1F}$, $R^{2F}$, $R^{3F}$, $R^{4F}$, $R^{5F}$, $R^{6F}$, $R^{7F}$, and $R^{8F}$ that are adjacent may be joined to each other to form a ring. When they form a ring, examples of the ring structure include a 5- or 6-membered aliphatic or aromatic ring; it may be a heterocyclic ring containing an element other than a carbon atom, and rings thus formed may be further combined to form a bicyclic ring, for example a fused ring. These ring structures may further have a substituent. Examples of the substituent include a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group. Examples of a heteroatom when the resulting ring structure is a heterocyclic ring include N, O, and S.

Examples of the thioxanthone compound include thioxanthone, 2-isopropylthioxanthone, 4-isopropylthioxanthonem, 2-chlorothioxanthone, 2-dodecylthioxanthone, 2,3-diethylthioxanthone, 2,4-diethylthioxanthone, 2,4-dimethylthioxanthone, 2,4-dichlorothioxanthone, 1-chloro-4-propoxythioxanthone, 2-cyclohexylthioxanthone, 4-cyclohexylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboxylmide, N-(1,1,3,3-tetramethylbutyl)thioxanthone-3,4-dicarboxylmide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride. Among them, from the viewpoint of ready availability and curability, thioxanthone, 2-isopropylthioxanthone, 4-isopropylthioxanthone, 2,3-diethylthioxanthone, 2,4-diethylthioxanthone, 2,4-dichlorothioxanthone, 1-chloro-4-propoxythioxanthone, and 2-cyclohexylthioxanthone are preferable, and 2-isopropylthioxanthone and 4-isopropylthioxanthone are more preferable.

With regard to Component C-1, one type may be used on its own or a plurality of types may be used in combination, and there are no particular limitations.

From the viewpoint of curability, the content of Component C-1 relative to the entire ink composition is preferably 0.1 to 10 mass %, more preferably 0.2 to 5 mass %, and yet more preferably 0.3 to 3 mass %.

(Component C-2) Other Polymerization Initiator

The ink composition of the present invention preferably uses, as the polymerization initiator (Component C), in addition to Component C-1, (Component C-2) another polymerization initiator in combination.

As Component C-2, a known radical polymerization initiator may be used. Component C-2 may be used singly or in a combination of two or more types.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, and (l) a compound having a carbon-halogen bond. With regard to these radical polymerization initiators, the above-mentioned compounds (a) to (l) may be used singly or in combination. The radical polymerization initiator in the present invention may suitably be used singly or in a combination of two or more types.

Preferred examples of the aromatic ketone (a) include a compound having a benzophenone skeleton described in 'RADIATION CURING IN POLYMER SCIENCE AND TECHNOLOGY' J. P. FOUASSIER J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, and a coumarin described in JP-B-59-42864.

Preferred examples of (b) an acylphosphine compound include acylphosphine oxide compounds described in paragraphs 0080 to 0098 of JP-A-2009-096985. Among them, those having a partial structure represented by Formula (C-2-1) or Formula (C-2-2) in the structure of the compound are preferable.

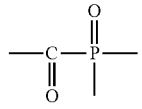

(C-2-1)

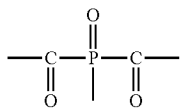

(C-2-2)

The acylphosphine oxide compound is particularly preferably a compound having a chemical structure represented by Formula (C-2-3) or Formula (C-2-4).

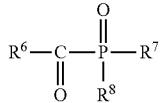

(C-2-3)

(In Formula (C-2-3), $R^6$, $R^7$, and $R^8$ independently denote an aromatic hydrocarbon group, which may have a methyl group or an ethyl group as a substituent.)

With regard to a monoacylphosphine oxide compound represented by Formula (C-2-3), it is preferable that $R^6$ to $R^8$ are phenyl groups, which may have a methyl group as a substituent, and it is more preferable that $R^7$ and $R^8$ are phenyl groups and $R^6$ is a phenyl group having 1 to 3 methyl groups.

Among them, as the monoacylphosphine oxide compound represented by Formula (C-2-3), 2,4,6-trimethylbenzoyldiphenylphosphine oxide (Darocur TPO manufactured by BASF Japan, Lucirin TPO manufactured by BASF) is preferable.

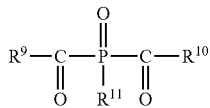

(C-2-4)

(In Formula (c-2-4), $R^9$, $R^{10}$ and $R^{11}$ independently denote an aromatic hydrocarbon group, which may have a methyl group or an ethyl group as a substituent.)

In the present invention, with regard to a bisacylphosphine oxide compound represented by Formula (C-2-4), it is preferable that $R^9$ to $R^{11}$ are phenyl groups, which may have a methyl group as a substituent, and it is more preferable that $R^{11}$ is a phenyl group and $R^9$ and $R^{10}$ are phenyl groups having 1 to 3 methyl groups.

Among them, as the bisacylphosphine oxide compound represented by Formula (C-2-4), bis(2,4,6-trimethylbenzoyl) phenylphosphine oxide (IRGACURE 819, manufactured by BASF Japan) is preferable.

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4760013, 4734444, and 2833827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl) benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4, 4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium salt compound (i) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described JP-A-1-304453 and JP-A-1-152109.

Specific examples of the titanocene compound include dicyclopentadienyl-Ti-dichloride, dicyclopentadienyl-Ti-bis-phenyl, di-cyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,6-difluoro-3-(pyrr-1-yl)phenyl) titanium, bis(cyclopentadienyl)bis[2,6-difluoro-3-(methylsulfonamido)phenyl]titanium, and bis(cyclopentadienyl)bis [2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901, 710 and 4,181,531, JP-A-60-198538, and JP-A-53-133022, iminosulfonate compounds described in EP Nos. 0199672, 84515, 199672, 044115, and 0101122, U.S. Pat. Nos. 4,618, 564, 4,371,605, and 4431774, JP-A-64-18143, JP-A-2-245756, and JP-A-4-365048, and compounds described in JP-B-62-6223, JP-B-63-14340, and JP-A-59-174831.

Preferred examples of the compound (I) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

The ink composition of the present invention preferably contain, as a polymerization initiator, a compound which functions as a sensitizer (hereinafter also calls 'sensitizer') in order to promote decomposition of the photopolymerization initiator by absorbing specific actinic radiation.

Examples of the sensitizer include polynuclear aromatic compounds (e.g. pyrene, perylene, triphenylene, 2-ethyl-9, 10-dimethoxy anthracene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

In the present invention, from the viewpoint of curability, it is preferable to use in combination, as polymerization initiators, the thioxanthone compound (Component C-1) and an acylphosphine compound as Component C-2. The acylphosphine compound is preferably an acylphosphine oxide compound, and more preferably a bisacylphosphine oxide compound.

In the ink composition of the present invention, the total content of Component C is preferably 1 to 25 mass % relative to the mass of the entire ink composition, more preferably 2 to 20 mass %, yet more preferably 3 to 15 mass %, and particularly preferably 4 to 9 mass %. When the content is at least 1 mass %, the ink composition can be fully cured, and when it is no greater than 25 mass %, a cured film having a uniform degree of curing can be obtained.

(Component D) Difunctional Monomer Having a Viscosity at 25° C. Of No Greater than 15 mPa·sec In the present invention, the ink composition preferably comprises (Component D) a difunctional monomer having a viscosity at 25° C. of no greater than 15 mPa·sec. It is preferable for Component D to be contained since the viscosity of the ink decreases to thus improve discharge properties and the adhesion and the heat resistance improve.

In the present invention, a method for measuring viscosity at 25° C. of a polymerizable compound (a monomer, an oligomer, etc.) or an ink composition is not particularly limited, but a method in accordance with JIS Z8803 is preferable.

Furthermore, as equipment for measuring viscosity, a rotary viscometer is preferably used, and use of a B type or E type rotary viscometer is preferable.

As a method for measuring the viscosity at 25° C. of a polymerizable compound and an ink composition, specifically, it is preferable to carry out measurement using for example a model RE80 viscometer (Toki Sangyo Co., Ltd.) at a liquid temperature of 25° C. after stabilization by rotating a rotor for 2 min.

Component D is preferably a compound represented by Formula (d-1) below.

$$A\text{-}B\text{-}A' \qquad (d\text{-}1)$$

(In Formula (d-1), A denotes a group selected from the group consisting of (A-1) to (A-3) below, A' denotes a group selected from the group consisting of (A'-1) to (A'-3) below, and B denotes a divalent linking group represented by Formula (B-1) or (B-2) below.)

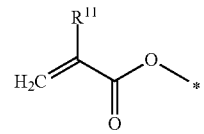
(A-1)

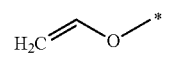
(A-2)

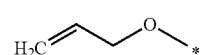
(A-3)

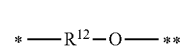
(B-1)

(B-2)

(A'-1)

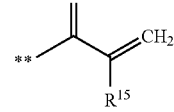
(A'-2)

(A'-3)

(In Formula (A-1) $R^{11}$ denotes a hydrogen atom or a methyl group, in Formula (B-1) $R^{12}$ denotes a saturated hydrocarbon group having 2 to 12 carbons, in Formula (B-2) one of $R^{13}$ and $R^{14}$ denotes a hydrogen atom, the other denotes a hydrogen atom or a methyl group, and n denotes an integer of 2 to 10, in Formula (A'-1) $R^{15}$ denotes a hydrogen atom or a methyl group, * denotes the position of bonding between A and B, and ** denotes the position of bonding between B and A'.)

In Formula (B-1), $R^{12}$ denotes a saturated hydrocarbon group having 2 to 12 carbons, and the saturated hydrocarbon group may be any of straight-chain, branched, and cyclic but is preferably straight-chain or branched. The saturated hydrocarbon group preferably has 2 to 9 carbons.

In Formula (B-2), n denotes an integer of 2 to 10 and is preferably 2 to 6, and more preferably 2 or 3.

Specific examples of the compound represented by Formula (d-1) include 2-(2-vinyloxyethoxy)ethyl acrylate (VEEA, Nippon Shokubai Co., Ltd., viscosity (25° C.): 3.65 mPa·sec), 2-(2-vinyloxyethoxy)ethyl methacrylate (VEEM, Nippon Shokubai Co., Ltd., viscosity (25° C.): 3.19 mPa·sec), hexanediol diacrylate (viscosity (25° C.): 5 to 9 mPa·sec), 3-methyl-1,5-pentanediol diacrylate (viscosity (25° C.): 4 to 8 mPa·sec), neopentyl glycol diacrylate (viscosity (25° C.): 10 mPa·sec), triethylene glycol diacrylate (viscosity (25° C.): 15 mPa·sec), 1,3-butanediol diacrylate (viscosity (25° C.): 9 mPa·sec), 1,4-butanediol diacrylate (viscosity (25° C.): 8 mPa·sec), diethylene glycol diacrylate (viscosity (25° C.): 12 mPa·sec), dipropylene glycol diacrylate (viscosity (25° C.): 11 mPa·sec), and nonanediol diacrylate (viscosity (25° C.): 8 mPa·sec).

Furthermore, Component D is preferably a compound represented by Formula (d-2) below. The compound represented by Formula (d-2) has a (meth)acrylate group and a vinyl ether group.

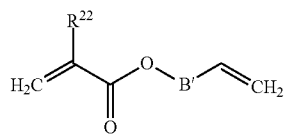

(d-2)

(In Formula (d-2), $R^{22}$ denotes a hydrogen atom or a methyl group and B' denotes a group represented by Formula (B'-1) or (B'-2) below.)

(B'-1)

(B'-2)

(In Formula (B'-1), $R^{12}$ denotes a saturated hydrocarbon group having 2 to 12 carbons, in Formula (B'-2) one of $R^{13}$ and $R^{14}$ denotes a hydrogen atom, the other denotes a hydrogen atom or a methyl group, n denotes an integer of 2 to 10, * denotes the position of bonding between the oxygen atom and B', and ** denotes the position of bonding between B' and the vinyl group.)

In Formula (B'-1), $R^{12}$ has the same meaning as that of $R^{12}$ in Formula (B-1), and a preferred range is also the same. In Formula (B'-2), $R^{13}$, $R^{12}$, and n have the same meanings as those of $R^{13}$, $R^{12}$, and n in Formula (B-2), and preferred ranges are also the same.

Among them, as the compound represented by Formula (d-2), 2-(2-vinyloxyethoxy)ethyl acrylate (VEEA, Nippon Shokubai Co., Ltd., viscosity (25° C.): 3.65 mPa·sec) and 2-(2-vinyloxyethoxy)ethyl methacrylate (VEEM, Nippon Shokubai Co., Ltd., viscosity (25° C.): 3.19 mPa·sec) are preferable.

With regard to Component D, one type may be used on its own or two or more types may be used in combination.

The content of Component D relative to the entire ink composition is preferably 0.1 to 10 mass %, more preferably 0.3 to 5 mass %, and yet more preferably 0.5 to 3 mass %. It is preferable for the content of Component D to be in this range since the viscosity of the ink appropriately decreases, the discharge properties are excellent, and the adhesion and heat resistance improve.

In the present invention, the total amount of polymerizable monomers, including Component A and Component D, is preferably 70 to 98 mass % of the entire ink composition, and more preferably 71 to 95 mass %. It is preferable for the total amount of polymerizable monomers to be in this range since the stretchability and curability are excellent.

(Component E) Resin Having Urethane Bond in Main Chain and Having Ethylenically Unsaturated Group and Polysiloxane Structure in Side Chain and/or at Terminal The ink composition of the present invention may comprise (Component E) a resin having a urethane bond in a main chain and having an ethylenically unsaturated group and a polysiloxane structure in a side chain and/or at a terminal.

The resin having a urethane bond in a main chain and having an ethylenically unsaturated group and a polysiloxane structure in a side chain and/or at a terminal used as Component E of the ink composition of the present invention is explained below.

Component E is also called a 'surface segregated polymer' as appropriate. It is surmised that due to Component E being localized on the surface of an ink-cured film, the film hardness, the stretchability at high temperature, and the resistance to ink flow improve.

Component E has a urethane bond in a main chain. Furthermore, Component E has an ethylenically unsaturated group in a side chain and/or at a main chain terminal, preferably has an ethylenically unsaturated group at a side chain terminal and/or at a main chain terminal, and more preferably has an ethylenically unsaturated group at a side chain terminal. Moreover, Component E preferably has a polysiloxane structure-containing group in a side chain and/or at a main chain terminal, more preferably has a polysiloxane structure-containing group at a side chain terminal and/or at a main chain terminal, and yet more preferably has a polysiloxane structure-containing group at a side chain terminal.

The main chain structure, polysiloxane structure-containing group, and ethylenically unsaturated group that constitute Component E are explained below.

<Main Chain Structure>

Component E is a so-called polyurethane resin, which contains in a main chain a urethane bond (—NRCOO— or —OCONR—; R denotes a hydrogen atom or an optionally substituted alkyl group having 1 to 6 carbons). Examples of the substituent that the alkyl group may have include a halogen atom, a hydroxy group, and an amino group. With regard to the main chain structure of Component E, a polyurethane structure may be formed by reacting a polyisocyanate component such as a diisocyanate and a polyol component such as a diol.

Specific preferred examples of the polyisocyanate component that can form a polyurethane structure include tolylene diisocyanate, isophorone diisocyanate, hexamethylene diisocyanate, trimethylhexamethylene diisocyanate, norbornene diisocyanate, dicyclohexylmethane-4,4-diisocyanate, xylylene diisocyanate, diphenylmethane-4,4-diisocyanate, and dimer acid diisocyanate.

Examples of the polyol component that can form a polyurethane structure include ethylene glycol, polyethylene glycol, propylene glycol, polypropylene glycol, 1,4-butanediol, 2,3-butanediol, 1,3-butanediol, neopentyl glycol, methylpentanediol, 1,6-hexanediol, trimethylhexamethylenediol, 2-methyloctanediol, 1,9-nonanediol, 1,4-cyclohexanedimethanol, tricyclodecanedimethanol, polycaprolactonediol, polycarbonate diol, glycerol, trimethylolpropane, trimethyloloctane, pentaerythritol, and polytetramethylene glycol.

Among them, it is preferable to use a polyol having a molecular weight of no greater than 4,000.

<Polysiloxane Structure-Containing Group>

A polysiloxane structure-containing group contained in Component E (surface segregated polymer) in the present invention is not particularly limited as long as it has an '—Si—O—Si-' structure, but it is preferably present in at least one of a side chain and/or a main chain terminal of Component E. Specifically, a group represented by Formula (e2-1) or a group represented by Formula (e2-2) is preferable.

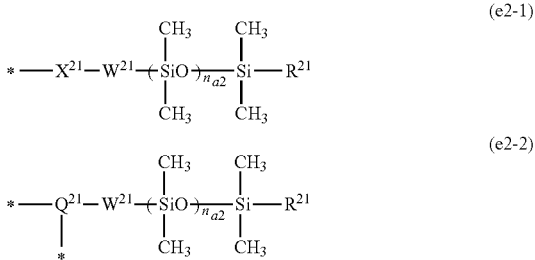

(e2-1)

(e2-2)

In Formula (e2-1), $R^{21}$ denotes an alkyl group or an aryl group, $W^{21}$ denotes a divalent linking group, and $X^{21}$ denotes any of —O—, —S—, and —N($R^{24}$)— groups. Here, $R^{24}$ denotes a hydrogen atom or an alkyl group having 1 to 4 carbons. Furthermore, $n_{a2}$ denotes an integer of 5 to 100, and * denotes the position of bonding to a main chain and/or a main chain terminal of the polymer.

The alkyl group denoted by $R^{21}$ preferably has 1 to 12 carbons and may have a straight-chain structure or a branched structure. Specific examples include a methyl group, an ethyl group, a propyl group, an isopropyl group, a butyl group, an isobutyl group, a sec-butyl group, and a t-butyl group. It is more preferably an alkyl group having 1 to 6 carbons, yet more preferably an alkyl group having 1 to 4 carbons and having a straight-chain structure, and particularly preferably a butyl group.

The aryl group denoted by $R^{21}$ preferably has 6 to 20 carbons, and more preferably 6 to 14 carbons. Specific examples of the aryl group denoted by $R^{21}$ include a phenyl group, a biphenyl group, and a naphthyl group, and a phenyl group is preferable.

The divalent linking group denoted by $W^{21}$ is preferably an alkylene group having 1 to 20 carbons or an arylene group. The alkylene group may be a straight-chain structure or a branched structure. It may have a substituent or be unsubstituted. Examples of the substituent that may be present include a halogen atom.

When $W^{21}$ is an alkylene group having 1 to 20 carbons, it is preferably unsubstituted; it is more preferably an unsubstituted alkylene group having 1 to 10 carbons, and yet more preferably an unsubstituted alkylene group having 1 to 4 carbons. Specific examples of the alkylene group include a methylene group, an ethylene group, a propylene group, a butylene group, a pentylene group, a hexylene group, an octylene group, and a decylene group. These groups may have a straight-chain structure or a branched structure.

When $W^{21}$ is an arylene group, it is preferably an arylene group having 6 to 20 carbons, and more preferably an arylene group having 6 to 12 carbons. Specific examples thereof include a phenylene group, a biphenylene group, and a naphthylene group. Among them, a phenylene group is particularly preferable.

Furthermore, in the divalent linking group denoted by $W^{21}$, an imino bond (—NH—), an amide bond (—CONH—), an ester bond (—COO— or —OCO—), an ether bond (—O—), a sulfonamide bond (—NHSO$_2$— or —SO$_2$NH—), a urethane bond (—NHCOO— or —OCONH—), a ureylene bond (—NHCONH—), a carbonate bond (—OCOO—), or a heterocyclic group (specifically, a group formed by removing two hydrogen atoms from a heterocycle such as triazine, isocyanuric acid, or piperazine) may be present as a bonding group.

Among them, $W^{21}$ is preferably an unsubstituted alkylene group having 1 to 4 carbons or an unsubstituted alkylene group having 1 to 8 carbons and containing an ether bond (—O—) as a bonding group, and —CH$_2$CH$_2$—O—CH$_2$CH$_2$— is particularly preferable (** denotes a bonding position).

$X^{21}$ is any one of —O—, —S—, and —N($R^{24}$)— groups. Here, $R^{24}$ denotes a hydrogen atom or an alkyl group having 1 to 4 carbons; the alkyl group may have a straight-chain structure or a branched structure, and specific examples include a methyl group, an ethyl group, a propyl group, an isopropyl group, an n-butyl group, an isobutyl group, and a tert-butyl group. Among them, $R^{24}$ is preferably a hydrogen atom or a methyl group.

Furthermore, $X^{21}$ is most preferably —O—.

In Formula (e2-2), $R^{21}$ denotes an alkyl group or an aryl group, $W^{21}$ denotes a divalent linking group, and $Q^{21}$ denotes a trivalent linking group having any two of —O—, —S—, and —N($R^{24}$)— groups. Here, $R^{24}$ denotes a hydrogen atom or an alkyl group having 1 to 4 carbons. Furthermore, $n_{a2}$ denotes an integer of 5 to 100, and * denotes a position of bonding to a main chain and/or a main chain terminal of a polymer.

In Formula (e2-2), $R^{21}$, $W^{21}$, $R^{24}$, and $n_{a2}$ have the same meanings as those of $R^{21}$, $W^{21}$, $R^{24}$, and $n_{a2}$ in Formula (e2-1).

$Q^{21}$ is a trivalent linking group having any two of —O—, —S—, and —N($R^{24}$)— groups at a terminal. The trivalent linking group denoted by $Q^{21}$ is preferably an alkanetriyl group (a trivalent group formed by removing two hydrogen atoms from an alkyl group) having 1 to 20 carbons or an arenetriyl group (a trivalent group formed by removing two hydrogen atoms from an aryl group). The alkanetriyl group may have a straight-chain structure or a branched structure. Furthermore, it may have a substituent or may be unsubstituted. Examples of the substituent that may be present include a halogen atom.

When $Q^{21}$ is an alkanetriyl group having 1 to 20 carbons, it is preferably unsubstituted, more preferably an unsubstituted alkanetriyl group having 1 to 10 carbons, and yet more preferably an unsubstituted alkanetriyl group having 1 to 4 carbons. Specific examples of the alkanetriyl group include a methanetriyl group, an ethanetriyl group, a propanetriyl group, a butanetriyl group, a pentanetriyl group, a hexanetriyl group, an octanetriyl group, and a decanetriyl group. The alkanetriyl group may have a straight-chain structure or a branched structure but is preferably an alkanetriyl group having a branched structure.

When $Q^{21}$ is an arenetriyl group, it is preferably an arenetriyl group having 6 to 20 carbons, and more preferably an arenetriyl group having 6 to 12 carbons. Specific examples include a benzenetriyl group, a biphenyltriyl group, and a naphthalenetriyl group.

$Q^{21}$ has any two of —O—, —S—, and —N($R^{24}$)— groups regardless of whether it is an alkanetriyl group or an arenetriyl group. These two groups may be present at any positions of the alkanetriyl group or the arenetriyl group.

$Q^{21}$ is more preferably a trivalent linking group that is a branched alkanetriyl group having 3 to 10 carbons, has at least two ether bonds (—O—) at termini, and has at least one single bond.

A specific method for introducing a group represented by Formula (e2-1) or Formula (e2-2) to a main chain and/or a main chain terminal of Component E is described later, but a commercially available compound having the structure of Formula (e2-1) or Formula (e2-2) may be applied when synthesizing Component E.

As the compound having the structure of Formula (e2-1) or Formula (e2-2), an alcohol compound, an amine compound, a thiol compound, etc. may be used; an alcohol compound is preferable, and specifically a compound represented by Formula (e2-3) or Formula (e2-4) is more preferable.

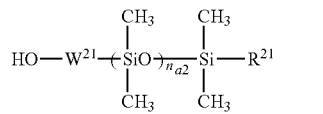

(e2-3)

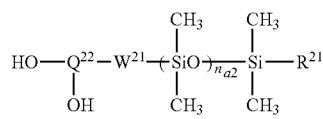

(e2-4)

In Formula (e2-3) and Formula (e2-4), $W^{21}$, $R^{21}$, and $n_{a2}$ have the same meanings as those in Formula (e2-1) and Formula (e2-2), including preferred ranges. In Formula (e2-4), $Q^{22}$ is a trivalent linking group and is an alkanetriyl group or arenetriyl group having 1 to 20 carbons, and it may be straight-chain or branched, but is preferably branched. It is preferably a trivalent linking group that is linked to two ether bonds and one single bond.

Examples of compounds represented by Formula (e2-3) and Formula (e2-4) include those shown below (in the compound examples, $n_{a2}$ is an integer of 5 to 100). However, the present invention is not limited thereto.

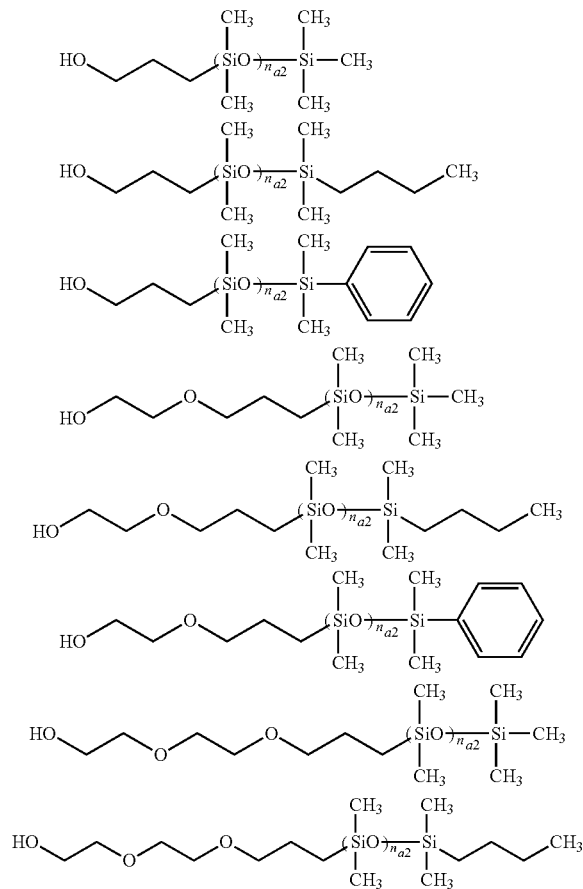

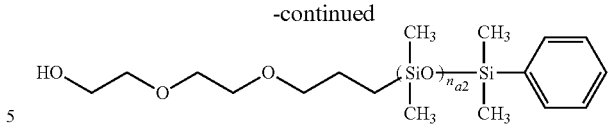

Furthermore, alcohol compounds represented by Formula (e2-3) or Formula (e2-4) are available as commercial products; examples thereof include X-22-170BX, X-22-170DX, and X-22-173DX manufactured by Shin-Etsu Chemical Co., Ltd. and SILAPLANE FM-0411, FM-0421, FM-0425, FM-DA11, FM-DA21, and FM-DA26 manufactured by Chisso.

When a polysiloxane structure-containing group is introduced into Component E, it is preferably contained in a main chain structure and/or at at least either one of the main chain terminals.

As a method for introducing a polysiloxane structure-containing group into a main chain, specifically, when obtaining a polyurethane structure by reacting a polyisocyanate and a polyol described above, a diol having a polysiloxane structure-containing group may be used as a starting material.

As a method for introducing a polysiloxane structure-containing group at a main chain terminal, specifically, when synthesizing Component E, an alcohol compound having a group having a polysiloxane structure corresponding to the structure that it is desired to introduce is selected as appropriate and may be used as a polymerization terminator. Specific examples include a monohydric alcohol compound having the polysiloxane structure-containing group described above.

Specifically, first, when obtaining a polyurethane structure by reacting a polyisocyanate and a polyol described above, a reaction is carried out so that the total number of moles of isocyanate groups contained in the synthetic system is in small excess relative to the total number of moles of hydroxy groups contained therein, thus giving a polymer having an isocyanate group at a terminal.

Subsequently, by reacting the isocyanate group formed at the polymer terminal with a monohydric alcohol compound having the polysiloxane structure-containing group, the polysiloxane structure may be introduced at a polymer main chain terminal. The level of small excess of the isocyanate group is appropriately determined according to the molecular weight of the Component E that is formed.

<Ethylenically Unsaturated Group>

Component E has an ethylenically unsaturated group in a side chain and/or at a main chain terminal.

It is surmised that due to Component E containing an ethylenically unsaturated group, the cured film surface of the ink composition can be covered by Component E and becomes stronger. It is therefore surmised that an inkjet ink composition having excellent film hardness, stretchability at high temperature, and resistance to ink flow can be provided.

Examples of the ethylenically unsaturated group include an unsaturated carboxylic acid ester group such as an acrylic acid ester group, a methacrylic acid ester group, an itaconic acid ester group, a crotonic acid ester group, an isocrotonic acid ester group, or a maleic acid ester group and a radically polymerizable group such as a styrene group. Among them, an acrylic acid ester group and a methacrylic acid ester group (that is, a (meth)acrylic acid ester group) are preferable.

As a method for introducing an ethylenically unsaturated group into Component E, there can be cited a method in which a monomer having the double bond reactivity of an ethylenically unsaturated group locked using a protecting group is used, and after copolymerizing this monomer the protecting group is removed to form a double bond and a method in which a low molecular weight compound having an ethylenically unsaturated group is introduced by a polymer reaction into a polymer, which becomes a starting material for Component E.

As Component E, a resin represented by Formula (E-1) to Formula (E-3) is more preferably used.

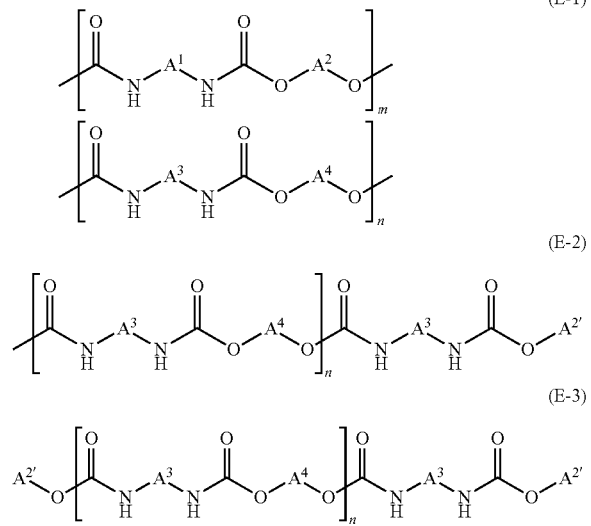

(In Formula (E-1) to Formula (E-3), $A^1$ and $A^3$ independently denote an alkylene group having 5 to 15 carbons, a divalent linking group containing an aromatic hydrocarbon ring, or a divalent linking group containing an aliphatic hydrocarbon ring, $A^2$ denotes a divalent linking group having a polysiloxane structure in a side chain, $A^{2'}$ denotes a monovalent group having a polysiloxane structure, and $A^4$ denotes a divalent linking group having an ethylenically unsaturated group in a side chain. m and n denote positive numbers that satisfy m:n=100:1 to 1:100.)

In Formula (E-1) to Formula (E-3), $A^1$ and $A^3$ denote a basic structure to which is bonded the isocyanate group of a diisocyanate compound that can form the polyurethane structure explained above for the main chain structure of Component E. Examples of preferred structures of $A^1$ and $A^3$ include the basic structures to which is bonded the isocyanate group of a diisocyanate compound that is cited as a specific preferred example for the diisocyanate compound that can form the polyurethane structure explained above for the main chain structure of Component E.

The alkylene group having 5 to 15 carbons may be any of straight-chain, branched, and cyclic alkylene groups and is preferably a straight-chain alkylene group. The number of carbons is preferably 5 to 12, and more preferably 6 to 10.

The divalent linking group containing an aromatic hydrocarbon ring is preferably a group formed by removing two hydrogen atoms from an aromatic hydrocarbon compound formed from at least one aromatic hydrocarbon ring and at least one alkyl group having 1 to 4 carbons. Examples of the aromatic hydrocarbon ring include a benzene ring and a naphthalene ring. Examples of an aromatic hydrocarbon compound formed from an aromatic hydrocarbon ring and an alkyl group having 1 to 4 carbons include m-xylene, p-xylene, toluene, and diphenylmethane.

Furthermore, the divalent linking group containing an aliphatic hydrocarbon ring is preferably a group formed by removing two hydrogen atoms from an aliphatic hydrocarbon compound formed from at least one aliphatic hydrocarbon ring and at least one alkyl group having 1 to 4 carbons. The aliphatic hydrocarbon ring is preferably a cyclohexane ring. Examples of the aliphatic hydrocarbon compound formed from at least one aliphatic hydrocarbon ring and at least one alkyl group having 1 to 4 carbons include dicyclohexylmethane, 1,1,3,3-tetramethylcyclohexane, and norbornane.

In Formula (E-1), $A^2$ denotes a divalent linking group having a polysiloxane structure in a side chain, and is preferably a group having a polysiloxane structure in which two ether bonds are removed from $Q^{21}$ when it has two ether bonds in Formula (e2-2), which is a preferred example of the group having a polysiloxane structure of Component E described above.

In Formula (E-2) and Formula (E-3), $A^{2'}$ denotes a monovalent group having a polysiloxane structure, and is preferably a group having a polysiloxane structure in which an ether bond is removed when $X^{21}$ is an ether bond (—O—) in Formula (e2-1), which is a preferred example of the group having a polysiloxane structure of Component E described above.

In addition, when Component E is represented by Formula (E-2), it has a group having a polysiloxane structure at one terminal of a main chain, and when Component E is represented by Formula (E-3), it has a group having a polysiloxane structure at both termini of a main chain.

In Formula (E-1) to Formula (E-3), $A^4$ denotes a divalent linking group having an ethylenically unsaturated group in a side chain; it is not particularly limited, but is more preferably a group represented by Formula (e4-1).

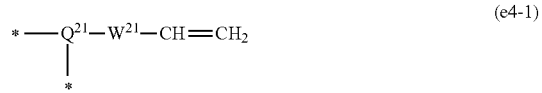

In Formula (e4-1), $W^{21}$ and $Q^{21}$ have the same meanings as those of $W^{21}$ and $Q^{21}$ in Formula (e2-2). With regard to a group represented by Formula (e4-1), $W^{21}$ is preferably an ester bond, and $Q^{21}$ is preferably a trivalent linking group that is a branched alkylene group having 3 to 10 carbons, has at least two ether bonds at termini, and has at least one single bond.

Specifically, it denotes a structure formed by removing two hydroxy groups from a di- or higher-hydric alcohol compound having an ethylenically unsaturated group. Preferred examples of the ethylenically unsaturated group include the groups cited as examples in the explanation of the ethylenically unsaturated group of Component E described above.

With regard to the di- or higher-hydric alcohol compound having an ethylenically unsaturated group, a diol having an ethylenically unsaturated group, which is a urethane starting material, is obtained by using, for example, 2,2-dimethyl-1, 3-dioxolane-4-methanol (Wako Pure Chemical Industries, Ltd.), in which an ethylenically unsaturated group is protected by an acetal group, as a starting material, carrying out (meth)acryloylation, introduction of a styryl group, and vinyl etherification in accordance with Tetrahedron Letters, 1985, 26, 3095, Angewandte Chemie, 2007, 119, 4229, and J. Am. Chem. Soc., 2002, 124, 1590, and then carrying out deacetalization using hydrogen chloride (methanol solution), etc.

Specific preferred examples of the di- or higher-hydric alcohol compound having an ethylenically unsaturated group include a compound of Formula (e4-2). The compound of Formula (e4-2) is available as the commercial product Blemmer GLM from NOF Corporation.

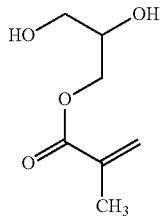
(e4-2)

In Formula (E-2) and Formula (E-3), if a monohydric alcohol having a polysiloxane structure is used as a starting material, a structure such as Formula (Ed-1) or Formula (Ed-2) in which addition is carried out at a main chain terminal might be obtained.

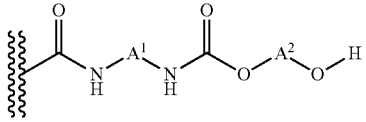
(Ee-3)

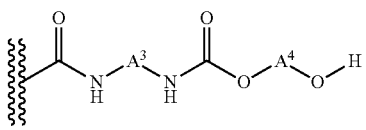
(Ee-4)

In Formula (E-1), m and n denote positive numbers that satisfy m:n=100:1 to 0.01:99.99. Furthermore, m and n denote the molar ratio of repeating units in Component E. m:n is preferably 0.1:99.9 to 10:90, and more preferably 0.5:99.5 to 5:95.

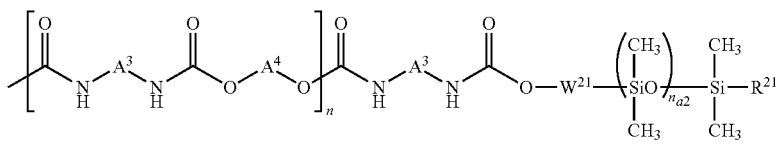
(Ed-1)

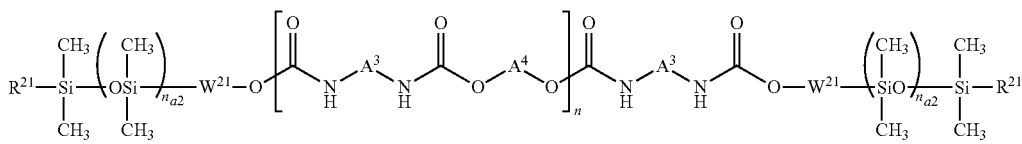
(Ed-2)

(In Formula (Ed-1) and Formula (Ed-2), $A^3$, $A^4$, and n have the same meanings as those of $A^3$, $A^4$, and n in Formula (E-2) and Formula (E-3), and $W^{21}$, $R^{21}$, and $n_{a2}$ have the same meanings as those of $W^{21}$, $R^{21}$, and $n_{a2}$ in Formula (e2-3).)

Furthermore, a main chain terminal group of a polymer represented by Formula (E-1) may contain various types of groups according to the method of synthesis of the polymer. By adding a known polymerization terminator, the terminal group might have a structure such as an isocyanate group, an amide group, or a hydroxy group, and specific examples thereof include, but are not limited to, the structures represented by Formula (Ee-1) to Formula (Ee-4).

In Formula (Ee-1) to Formula (Ee-4), $A^1$ to $A^4$ have the same meanings as those of $A^1$ to $A^4$ in Formula (E-1). A double wavy line portion denotes the position of bonding to the remaining portion of the resin of Formula (E-1).

With regard to the termini of the polymer of Formula (E-1), both termini may have an identical structure, or they may have different structures.

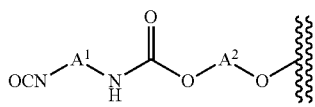
(Ee-1)

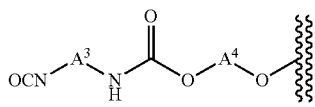
(Ee-2)

The main chain terminal group opposite to $A^{2'}$ of the polymer represented by Formula (E-2) may contain various groups according to the method of synthesis of the polymer. By adding a known polymerization terminator, the terminal group might have a structure such as an isocyanate group, an amide group, or a hydroxy group, and specific examples thereof include, but are not limited to, the structures represented by Formula (Ee-2) and Formula (Ee-4) above.

In Formula (Ee-2) and Formula (Ee-4), $A^3$ and $A^4$ have the same meanings as those of $A^1$ to $A^4$ in Formula (E-2). A double wavy line portion denotes the position of bonding to the remaining portion of the resin of Formula (E-2).

The weight-average molecular weight of Component E is preferably 5,000 to 20,0000, more preferably 8,000 to 150,000, and yet more preferably 10,000 to 100,000.

Furthermore, the content of Component E in the ink composition of the present invention is preferably 0.1 to 10 mass % of the total solids content of the ink composition, more preferably 0.1 to 5 mass %, and yet more preferably 0.2 to 3 mass %.

Specific preferred examples of the polymer of Component E in the present invention are listed in Table 1-1, Table 1-2, Table 2-1 and Table 2-2. The present invention is not in any way limited by these specific examples.

In Table 1-1, Table 1-2, Table 2-1 and Table 2-2 $A^1$ to $A^4$, and $A^{2'}$ denote $A^1$ to $A^4$ and $A^{2'}$ of Formula (E-1) to Formula (E-3). * denotes a bonding position.

TABLE 1-1

| Polymer No. | Weight-average molecular weight | | Diisocyanate-derived moiety *—C(=O)—NH—A¹(or A³)—NH—C(=O)—* | Diol-derived moiety | |
|---|---|---|---|---|---|
| | | | | Ethylenically unsaturated group *—O—A⁴—O—* | Polysiloxane structure *—O—A⁴—O—* or *—O—A²'— |
| 1 | 30,000 | Structure | [*—C(=O)—NH—CH₂—C₆H₄—CH₂—NH—C(=O)—*] | [glycerol methacrylate diol] | [trimethylolpropane-type polysiloxane with (SiMe₂O)₁₂SiMe₂C₄H₉] |
| | | Mol. ratio | 50 | 49.5 | 0.5 |
| 2 | 25,000 | Structure | [*—C(=O)—NH—CH₂—C₆H₄—CH₂—NH—C(=O)—*] | [glycerol methacrylate diol] | [trimethylolpropane-type polysiloxane with (SiMe₂O)₁₂SiMe₂C₄H₉] |
| | | Mol. ratio | 50 | 49 | 1 |
| 3 | 20,000 | Structure | [*—C(=O)—NH—CH₂—C₆H₄—CH₂—NH—C(=O)—*] | [glycerol methacrylate diol] | [trimethylolpropane-type polysiloxane with (SiMe₂O)₁₂SiMe₂C₄H₉] |
| | | Mol. ratio | 50 | 48 | 2 |
| 4 | 30,000 | Structure | [*—C(=O)—NH—CH₂—C₆H₄—CH₂—NH—C(=O)—*] | [glycerol methacrylate diol] | [ethylene glycol-linked polysiloxane with (SiMe₂O)₁₂SiMe₂C₄H₉] |
| | | Mol. ratio | 50 | 49.5 | 0.5 |
| 5 | 25,000 | Structure | [*—C(=O)—NH—CH₂—C₆H₄—CH₂—NH—C(=O)—*] | [glycerol methacrylate diol] | [ethylene glycol-linked polysiloxane with (SiMe₂O)₁₂SiMe₂C₄H₉] |
| | | Mol. ratio | 50 | 49 | 1 |
| 6 | 35,000 | Structure | [*—C(=O)—NH—CH₂—C₆H₄—CH₂—NH—C(=O)—*] | [glycerol methacrylate diol] | [ethylene glycol-linked polysiloxane with (SiMe₂O)₁₂SiMe₂C₄H₉] |
| | | Mol. ratio | 50 | 48 | 2 |

TABLE 1-1-continued

| Polymer No. | Weight-average molecular weight | | Diisocyanate-derived moiety $*-\underset{\underset{O}{\|}}{C}-\underset{H}{N}-A^1(\text{or }A^3)-\underset{H}{N}-\underset{\underset{O}{\|}}{C}-*$ | Diol-derived moiety | |
|---|---|---|---|---|---|
| | | | | Ethylenically unsaturated group $*-O-A^4-O-*$ | Polysiloxane structure $*-O-A^4-O-*$ or $*-O-A^{2'}$ |
| 7 | 30,000 | Structure | [bis-cyclohexyl methylene diamide] | [glycerol methacrylate diether] | [trimethylolpropane-linked polydimethylsiloxane, 12 units, C₄H₉ terminus] |
| | | Mol. ratio | 50 | 49.5 | 0.5 |
| 8 | 30,000 | Structure | [bis-cyclohexyl methylene diamide] | [glycerol methacrylate diether] | [trimethylolpropane-linked polydimethylsiloxane, 12 units, C₄H₉ terminus] |
| | | Mol. ratio | 50 | 49 | 1 |
| 9 | 30,000 | Structure | [bis-cyclohexyl methylene diamide] | [glycerol methacrylate diether] | [trimethylolpropane-linked polydimethylsiloxane, 12 units, C₄H₉ terminus] |
| | | Mol. ratio | 50 | 48 | 2 |

TABLE 1-2

| Polymer No. | Weight-average molecular weight | | Diisocyanate-derived moiety $*-\underset{\underset{O}{\|}}{C}-\underset{H}{N}-A^1(\text{or }A^3)-\underset{H}{N}-\underset{\underset{O}{\|}}{C}-*$ | Diol-derived moiety | |
|---|---|---|---|---|---|
| | | | | Ethylenically unsaturated group $*-O-A^4-O-*$ | Polysiloxane structure $*-O-A^2-O-*$ or $*-O-A^{2'}$ |
| 10 | 30,000 | Structure | [bis-cyclohexyl methylene diamide] | [glycerol methacrylate diether] | [ethyleneoxy-propyl polydimethylsiloxane, 12 units, C₄H₉ terminus] |
| | | Mol. ratio | 50 | 49.5 | 0.5 |
| 11 | 30,000 | Structure | [bis-cyclohexyl methylene diamide] | [glycerol methacrylate diether] | [ethyleneoxy-propyl polydimethylsiloxane, 12 units, C₄H₉ terminus] |
| | | Mol. ratio | 50 | 49 | 1 |

TABLE 1-2-continued
| Polymer No. | Weight-average molecular weight | | Diisocyanate-derived moiety *—C(=O)—NH—A¹(or A³)—NH—C(=O)—* | Diol-derived moiety | |
|---|---|---|---|---|---|
| | | | | Ethylenically unsaturated group *—O—A⁴—O—* | Polysiloxane structure *—O—A²—O—* or *—O—A²'* |
| 12 | 30,000 | Structure | 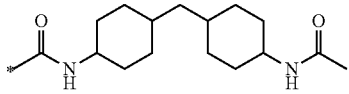 | 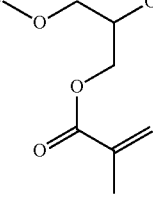 | 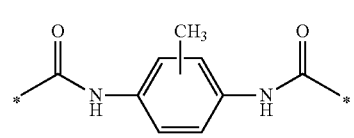 |
| | | Mol. ratio | 50 | 48 | 2 |
| 13 | 30,000 | Structure | 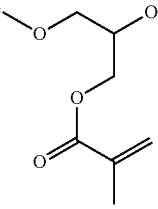 | | |
| | | Mol. ratio | 50 | 49.5 | 0.5 |
| 14 | 30,000 | Structure | 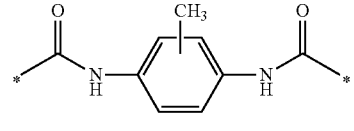 | | |
| | | Mol. ratio | 50 | 49 | 1 |
| 15 | 30,000 | Structure | 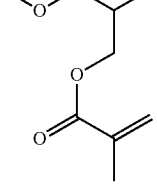 | 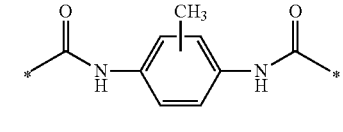 | 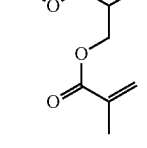 |
| | | Mol. ratio | 50 | 48 | 2 |
| 16 | 30,000 | Structure | 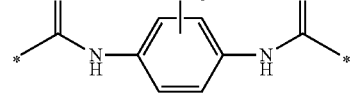 | 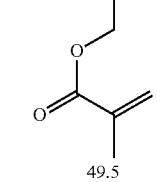 | |
| | | Mol. ratio | 50 | 49.5 | 0.5 |
| 17 | 30,000 | Structure | 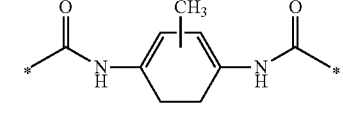 | 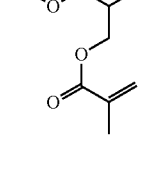 | |

TABLE 1-2-continued

| Polymer No. | Weight-average molecular weight | | Diisocyanate-derived moiety *—C(=O)—NH—A¹(or A³)—NH—C(=O)—* | Diol-derived moiety Ethylenically unsaturated group *—O—A⁴—O—* | Diol-derived moiety Polysiloxane structure *—O—A²—O—* or *—O—A²'* |
|---|---|---|---|---|---|
| | | Mol. ratio | 50 | 49 | 1 |
| 18 | 30,000 | Structure | (4-methyl-1,3-phenylene bis-carbamate structure) | glyceryl methacrylate-derived group | *—OCH₂CH₂O—CH₂CH₂CH₂—Si(CH₃)₂—[O—Si(CH₃)₂]₁₂—C₄H₉ |
| | | Mol. ratio | 50 | 48 | 2 |

TABLE 2-1

| Polymer No. | Weight-average molecular weight | | Diisocyanate-derived moiety *—C(=O)—NH—A¹(or A³)—NH—C(=O)—* | Diol-derived moiety Ethylenically unsaturated group *—O—A⁴—O—* | Diol-derived moiety Polysiloxane structure *—O—A²—O—* or *—O—A²'* |
|---|---|---|---|---|---|
| 19 | 30,000 | Structure | (4,4'-methylenebis(phenyl) bis-carbamate) | glyceryl methacrylate-derived group | *—OCH₂—C(CH₂CH₃)(CH₂O*)—CH₂—O—CH₂CH₂CH₂—Si(CH₃)₂—[O—Si(CH₃)₂]₁₂—C₄H₉ |
| | | Mol. ratio | 50 | 49.5 | 0.5 |
| 20 | 30,000 | Structure | (4,4'-methylenebis(phenyl) bis-carbamate) | glyceryl methacrylate-derived group | *—OCH₂—C(CH₂CH₃)(CH₂O*)—CH₂—O—CH₂CH₂CH₂—Si(CH₃)₂—[O—Si(CH₃)₂]₁₂—C₄H₉ |
| | | Mol. ratio | 50 | 49 | 1 |
| 21 | 30,000 | Structure | (4,4'-methylenebis(phenyl) bis-carbamate) | glyceryl methacrylate-derived group | *—OCH₂—C(CH₂CH₃)(CH₂O*)—CH₂—O—CH₂CH₂CH₂—Si(CH₃)₂—[O—Si(CH₃)₂]₁₂—C₄H₉ |
| | | Mol. ratio | 50 | 48 | 2 |
| 22 | 30,000 | Structure | (4,4'-methylenebis(phenyl) bis-carbamate) | glyceryl methacrylate-derived group | *—OCH₂CH₂O—CH₂CH₂CH₂—Si(CH₃)₂—[O—Si(CH₃)₂]₁₂—C₄H₉ |

TABLE 2-1-continued

| Polymer No. | Weight-average molecular weight | | Diisocyanate-derived moiety<br>$*-\underset{\underset{O}{\|}}{C}-\underset{H}{N}-A^1(\text{or } A^3)-\underset{H}{N}-\underset{\underset{O}{\|}}{C}-*$ | Diol-derived moiety | |
|---|---|---|---|---|---|
| | | | | Ethylenically unsaturated group<br>$*-O-A^4-O-*$ | Polysiloxane structure<br>$*-O-A^2-O-*$ or $*-O-A^{2'}$ |
| | | Mol. ratio | 50 | 49.5 | 0.5 |
| 23 | 30,000 | Structure | [structure: 4,4'-methylenediphenyl diisocyanate derived] | [glycerol methacrylate structure] | [PEG-propyl-polydimethylsiloxane, 12 units, C4H9 terminated] |
| | | Mol. ratio | 50 | 49 | 1 |
| 24 | 20,000 | Structure | [structure: 4,4'-methylenediphenyl diisocyanate derived] | [glycerol methacrylate structure] | [PEG-propyl-polydimethylsiloxane, 12 units, C4H9 terminated] |
| | | Mol. ratio | 50 | 48 | 2 |
| 25 | 30,000 | Structure | [hexamethylene diisocyanate derived] | [glycerol methacrylate structure] | [trimethylolpropane-based polysiloxane, 12 units, C4H9 terminated] |
| | | Mol. ratio | 50 | 49.5 | 0.5 |
| 26 | 30,000 | Structure | [hexamethylene diisocyanate derived] | [glycerol methacrylate structure] | [trimethylolpropane-based polysiloxane, 12 units, C4H9 terminated] |
| | | Mol. ratio | 50 | 49 | 1 |
| 27 | 30,000 | Structure | [hexamethylene diisocyanate derived] | [glycerol methacrylate structure] | [trimethylolpropane-based polysiloxane, 12 units, C4H9 terminated] |
| | | Mol. ratio | 50 | 48 | 2 |

TABLE 2-2

| Polymer No. | Weight-average molecular weight | | Diisocyanate-derived moiety *—C(=O)—NH—A¹(or A³)—NH—C(=O)—* | Diol-derived moiety | |
|---|---|---|---|---|---|
| | | | | Ethylenically unsaturated group *—O—A⁴—O—* | Polysiloxane structure *—O—A²—O—* or *—O—A²'* |
| 28 | 30,000 | Structure | [HDI-based diurethane structure] | [glycerol methacrylate structure] | [PDMS structure with 12 siloxane units] |
| | | Mol. ratio | 50 | 49.5 | 0.5 |
| 29 | 30,000 | Structure | [HDI-based diurethane structure] | [glycerol methacrylate structure] | [PDMS structure with 12 siloxane units] |
| | | Mol. ratio | 50 | 49 | 1 |
| 30 | 20,000 | Structure | [HDI-based diurethane structure] | [glycerol methacrylate structure] | [PDMS structure with 12 siloxane units] |
| | | Mol. ratio | 50 | 48 | 2 |
| 31 | 30,000 | Structure | [TMHDI-based diurethane structure] | [glycerol methacrylate structure] | [branched PDMS structure with 12 siloxane units] |
| | | Mol. ratio | 50 | 49.5 | 0.5 |
| 32 | 30,000 | Structure | [TMHDI-based diurethane structure] | [glycerol methacrylate structure] | [branched PDMS structure with 12 siloxane units] |
| | | Mol. ratio | 50 | 49 | 1 |
| 33 | 30,000 | Structure | [TMHDI-based diurethane structure] | [glycerol methacrylate structure] | [branched PDMS structure with 12 siloxane units] |

TABLE 2-2-continued

| Polymer No. | Weight-average molecular weight | | Diisocyanate-derived moiety *—C(=O)—N(H)—A¹(or A³)—N(H)—C(=O)—* | Diol-derived moiety Ethylenically unsaturated group *—O—A⁴—O—* | Diol-derived moiety Polysiloxane structure *—O—A²—O—* or *—O—A²'|
|---|---|---|---|---|---|
| | | Mol. ratio | 50 | 48 | 2 |
| 34 | 30,000 | Structure | 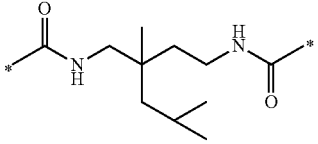 [SMILES: CC(=O)NCCC(C)(CNC(C)=O)CC(C)C] | 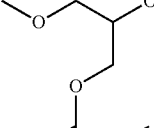 | 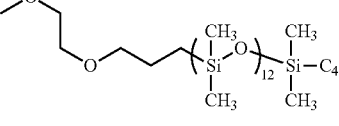 |
| | | Mol. ratio | 50 | 49.5 | 0.5 |
| 35 | 30,000 | Structure | 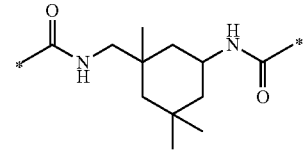 [SMILES: CC(=O)NCC1(C)CC(NC(C)=O)CC(C)(C)C1] | 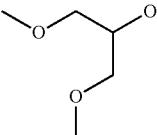 | 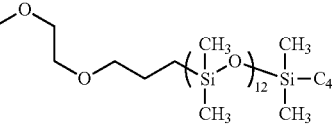 |
| | | Mol. ratio | 50 | 49 | 1 |
| 36 | 30,000 | Structure | 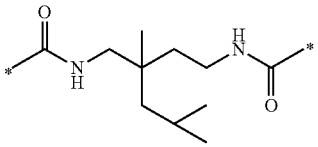 [SMILES: CC(=O)NCCC(C)(CNC(C)=O)CC(C)C] | 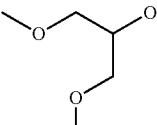 | 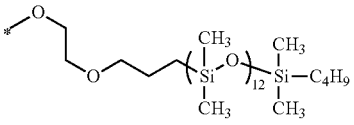 |
| | | Mol. ratio | 50 | 48 | 2 |

The ink composition of the present invention may comprise a component other than Components A to Component E above as necessary.

As the other component, a known additive may be used, and examples thereof include a colorant, a UV absorber, an antioxidant, an antifading agent, a conductive salt, a solvent, a polymer compound, a surfactant, a levelling additive, a matting agent, a wax, or a tackifier.

(Component F) Surfactant

The ink composition of the present invention may contain (Component F) a surfactant in order to provide stable discharge properties for a long period of time.

As the surfactant, those described in JP-A-62-173463 and JP-A-62-183457 can be cited. Examples thereof include anionic surfactants such as dialkylsulfosuccinic acid salts, alkylnaphthalene sulfonic acid salts, and fatty acid salts; nonionic surfactants such as polyoxyethylene alkyl ethers, polyoxyethylene alkyl aryl ethers, acetylene glycols, polyoxyethylene/polyoxypropylene block copolymers, and silicone oil; and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The content of the surfactant in the ink composition of the present invention is appropriately adjusted according to the intended application, and is preferably 0.0001 to 1 mass % relative to the entire mass of the ink composition.

(Component G) Colorant

In the present invention, the ink composition may preferably contain (Component G) a colorant in order to improve the visibility of a formed image area.

The colorant is not particularly limited, but a pigment and an oil-soluble dye that have excellent weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36; as a blue or cyan pigment, Pigment Blue 1, 15, 15:1, 15:2, 15:3, 15:4, 15:6, 16, 17-1, 22, 27, 28, 29, 36, or 60; as a green pigment, Pigment Green 7, 26, 36, or 50; as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9

It is preferable that the colorant is added to the ink composition and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition, but in order to improve dispersibility it may be added in advance to a solvent or a dispersing medium such as a polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a polymerizable compound. As a polymerizable compound used, it is preferable in terms of dispersion suitability to select a monomer having low viscosity. The colorants may be used by appropriately selecting one type or two or more types according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, clogging of a head nozzle can be suppressed, and the ink storage stability, the transparency, and the curing sensitivity can be maintained.

The content of the colorant in the ink composition is appropriately selected according to the color and the intended purpose, and is preferably 0.01 to 30 mass % relative to the mass of the entire ink composition.

(Component H) Dispersant

The ink composition of the present invention preferably comprises a dispersant. Especially, when the pigment is used, the ink composition preferably comprises (Component H) a dispersant in order to stably disperse the pigment in the ink composition. As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), Ionet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is generally preferably 0.05 to 15 mass % relative to the mass of the entire ink composition.

Other Components

The ink composition of the present invention may comprise as necessary, in addition to the above-mentioned components, a UV absorber, an antioxidant, an antifading agent, a conductive salt, a solvent, a polymer compound, a basic compound, etc. They are described in JP-A-2009-221416 and may be used in the present invention as well.

Furthermore, from the viewpoint of storage properties and suppression of head clogging, the ink composition of the present invention preferably comprises a polymerization inhibitor.

The polymerization inhibitor is preferably added at 200 to 20,000 ppm relative to the total amount of the ink composition of the present invention.

Examples of the polymerization inhibitor include a nitroso-based polymerization inhibitor, a hindered amine-based polymerization inhibitor, hydroquinone, benzoquinone, p-methoxyphenol, TEMPO, TEMPOL, and Al cupferron.

Properties of Ink Composition

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature (25° C.) is set to be high, even when a porous recording medium (support) is used, penetration of the ink composition into the recording medium can be prevented, and uncured monomer can be reduced. Furthermore, ink spreading when droplets of ink composition have landed can be suppressed, and as a result there is the advantage that the image quality is improved.

The surface tension of the ink composition of the present invention at 25° C. is preferably 28 to 37.5 mN/m, more preferably 31 to 37.5 mN/m, yet more preferably 32 to 37.0 mN/m, particularly preferable 32.5 to 36.8 mN/m, and most preferably 33.0 to 36.5 mN/m.

When in the above range, a printed material having excellent surface gloss is obtained.

As a method for measuring surface tension at 25° C. of the ink composition, a known method may be used, but it is preferable to carry out measurement by a suspended ring method or the Wilhelmy method. Preferred examples include a method using a CBVP-Z automated surface tensiometer manufactured by Kyowa Interface Science Co., Ltd. and a method using a SIGMA 702 manufactured by KSV INSTRUMENTS LTD.

2. Inkjet Recording Method, Inkjet Recording Equipment, and Printed Material

The inkjet recording method of the present invention is a method involving discharging the inkjet ink composition of the present invention onto a recording medium (a support, a recording material, etc.) for inkjet recording, and irradiating the inkjet ink composition discharged onto the recording medium with actinic radiation to thus cure the inkjet ink composition and form an image.

More specifically, the inkjet recording method of the present invention preferably comprises ($a^1$) a step of discharging the inkjet ink composition of the present invention onto a recording medium and ($b^1$) a step of irradiating the discharged inkjet ink composition with actinic radiation to thus cure the inkjet ink composition.

Due to the inkjet recording method of the present invention comprising the steps ($a^1$) and ($b^1$), an image is formed by the ink composition cured above the recording medium.

Furthermore, the inkjet recording method of the present invention is preferably carried out in a multipass mode in which the steps ($a^1$) and ($b^1$) are carried out two or more times in the same area above the recording medium, that is, printing is carried out by overlaying the same area. Due to the use of the ink composition of the present invention, when printing is carried out in a multipass mode, an image having excellent surface gloss is obtained.

Moreover, the printed material of the present invention is a printed material that has been recorded by the inkjet recording method of the present invention.

In step ($a^1$) and a step (a), which is described later, of the inkjet recording method of the present invention, inkjet recording equipment that is described in detail below may be employed.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition of the present invention onto a recording medium in step ($a^1$) and step (a) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink composition supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since, for the ink composition of the present invention, the temperature of the discharged ink composition is desirably constant, the inkjet recording device is preferably equipped with means for stabilizing the temperature of the ink composition. The section for which the temperature is made constant includes the whole of a piping system and all of the members from an ink tank (middle tank where it is present) to a nozzle injection face. That is, a section from an ink supply tank to an inkjet head portion can be thermally insulated and heated. A method of controlling temperature is not particularly limited, but it is preferable to provide, for example, temperature sensors at a plurality of piping locations, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition is discharged using the above-mentioned inkjet recording device, the ink composition is preferably discharged after being heated to preferably 25° C. to 80° C., and more preferably 32° C. to 50° C., so as to reduce the viscosity of the ink composition to preferably 3 to 15 mPa·s, and more preferably 3 to 13 mPa·s. In particular, it is preferable to use an ink composition having an ink viscosity at 25° C. of no greater than 50 mP·s as the ink composition of the present invention since discharging can be carried out well. By employing this method, high discharge stability can be realized.

An actinic radiation curing type ink composition such as the ink composition of the present invention generally has a viscosity that is higher than that of a water-based ink composition usually used for an inkjet recording ink composition, and variation in viscosity due to changes in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of the ink composition is preferably ±5° C. of a set temperature, more preferably ±2° C. of the set temperature, and yet more preferably ±1° C. of the set temperature.

Subsequently, ($b^1$) step and (b) step which is described later are explained.

The ink composition discharged onto the recording medium cures upon exposure to actinic radiation. This is due to a initiating species such as a radical being generated by decomposition of the photopolymerization initiator contained in the ink composition of the present invention by irradiation with actinic radiation, the initiating species functioning so as to make a polymerization reaction of a radically polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is preferably, for example, 200 to 600 nm, more preferably 300 to 450 nm, yet more preferably 320 to 420 nm, and particularly preferably UV rays having a peak wave length of 340 to 400 nm.

Moreover, the ink composition of the present invention has sufficient sensitivity even for low output actinic radiation. It is therefore desirable to cure it with an exposure area illumination intensity of preferably 10 to 4,000 $mW/cm^2$, and more preferably 20 to 2,500 $mW/cm^2$.

As an actinic radiation source, a mercury lamp, a gas/solid laser, etc. are mainly used, and for UV photocuring inkjet ink composition a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, the example of the LED includes a LED, disclosed in U.S. Pat. No. 6,084,250, that can emit actinic radiation whose wavelength is centered between 300 nm and 370 nm. Furthermore, another violet LED is available, and irradiation can be carried out with radiation of a different UV bandwidth. The actinic radiation source preferable in the present invention is a UV-LED, and a UV-LED having a peak wavelength at 340 to 400 nm is particularly preferable.

The maximum illumination intensity of the LED on a recording medium is preferably 10 to 2,000 $mW/cm^2$, more preferably 20 to 1,000 $mW/cm^2$, and particularly preferably 50 to 800 $mJ/cm^2$.

The ink composition of the present invention is desirably exposed to such actinic radiation preferably for 0.01 to 120 sec, and more preferably 0.1 to 90 sec.

Irradiation conditions for the actinic radiation and basic irradiation methods are disclosed in JP-A-60-132767. Specifically, light sources are provided on opposite sides of a head unit comprising an ink composition discharge system, and the head unit and the light sources are made to scan by a so-called shuttle system. Irradiation with actinic radiation is carried out after a fixed period of time (preferably 0.01 to 0.5 sec, more preferably 0.01 to 0.3 sec, and particularly preferably 0.01 to 0.15 sec) has elapsed after the ink composition has landed. By controlling the time from after the ink composition has landed until before the irradiation so that it is a very short time, it is possible to prevent the ink composition that has landed on a recording medium from spreading before being cured. Furthermore, when a porous recording medium is used, since exposure can be carried out before the ink composition penetrates to a deep part where the light source cannot reach, it is possible to suppress residual unreacted monomer, which is preferable.

Moreover, curing may be completed by another light source that is not driven. International patent application WO 99/54415 discloses as an irradiation method a method employing optical fiber or a method in which a collimated light source is shone on a mirror surface provided on a side face of a head unit and a recording area is irradiated with UV rays, and such a curing method can also be applied to the inkjet recording method of the present invention.

By employing the above-mentioned inkjet recording method, it is possible to keep the diameter of landed ink composition dots constant even for various recording media having different surface wettabilities, thus improving the image quality. When obtaining a colored image, by superimposing in order from low lightness inks, it becomes easy for radiation to reach ink in a lower part, and good curing sensitivity, reduction of residual monomer, and improvement in adhesion can be expected. Although it is possible to carry out irradiation all at once after all colors are discharged, it is preferable in terms of promoting curing that exposure to light is carried out for each color.

In this way, the ink composition of the present invention cures with high sensitivity upon exposure to actinic radiation, thereby forming an image on the surface of a recording medium.

The ink composition of the present invention is preferably used as an ink set comprising a plurality of inks for inkjet recording.

The order in which colored ink compositions are discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black.

Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and known recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

Furthermore, the ink composition of the present invention is suitable for the production of a decorative sheet, and in this case an inkjet recording method comprising the steps below, in this order, is preferable.

(Step a) A step of discharging the inkjet ink composition of the present invention onto a substrate, and (Step b) a step of irradiating the discharged inkjet ink composition with actinic radiation to thus produce a decorative sheet.

The decorative sheet is provided with an image layer formed by curing the ink composition of the present invention.

Furthermore, it is also preferable to produce a decorative sheet molded product by further including a step of subjecting the decorative sheet to vacuum forming, pressure forming, or vacuum/pressure forming.

Moreover, it is preferable for the decorative sheet molded product to be subjected to hole making.

In particular, since an image layer obtained from the ink composition of the present invention has excellent stretchability and heat resistance, even when it is subjected to vacuum forming, pressure forming, or vacuum/pressure forming, white spots, cracking, etc. in an image are suppressed. Furthermore, cracking of an image during hole making is also suppressed.

<Vacuum Forming, Pressure Forming, Vacuum/Pressure Forming>

Vacuum forming is a method in which a support having an image formed thereon is preheated to a temperature at which it can be thermally deformed, and molding is carried out by pressing it against a mold and cooling while sucking it toward the mold by means of a vacuum and stretching it. It is preferable to use a convex mold and a concave mold in combination in vacuum forming.

Pressure forming is a method in which a support having an image formed thereon is preheated to a temperature at which it can be thermally deformed, and molding is carried out by pressing it against a mold by applying pressure from the side opposite to the mold and cooling.

Vacuum/pressure forming is a method in which molding is carried out by applying a vacuum and pressure at the same time Details may be referred to in the 'Thermal Forming' section on p. 766 to 768 of 'Koubunshi Daijiten' (Polymer Dictionary) (Maruzen Co., Ltd.) and literature referred to in this section.

The forming temperature may be determined as appropriate according to the type of support and the support, but it is preferable to carry out forming at a support temperature of 60° C. to 180° C., more preferably 80° C. to 160° C., and yet more preferably 80° C. to 150° C. When in this range, forming is carried out with little change in image color and excellent mold release.

<Hole Making by Means of Trimming>

In the present invention, it is preferable to subject a decorative sheet or a decorative sheet molded product to hole making by means of trimming. The 'trimming' referred to here means the removal of an unwanted portion of a decorative sheet or a decorative sheet molded product after molding, and 'hole making by means of trimming' means removing an unwanted part by making a hole. From the viewpoint of productivity, the hole making is preferably carried out by punching.

Hole making may be carried out for a decorative sheet or may be carried out for a decorative sheet molded product, and is not particularly limited. Furthermore, hole making may be carried out subsequent to in-mold molding, which is described below.

The ink composition of the present invention is particularly suitable for in-mold molding.

In the present invention, a process for producing an in-mold molded article preferably comprises (step 1) a step of placing a decorative sheet or a decorative sheet molded product on an inner wall of a hollow part formed from a plurality of molds, and (step 2) a step of injecting a molten resin into the hollow part via a gate.

Examples of step (1) include a step in which the decorative sheet of the present invention is placed within a mold and sandwiched. Specifically, the decorative sheet is fed into a mold for molding formed from a plurality of movable and fixed molds preferably with the image layer on the inside. In this process, a plurality of decorative sheets may be fed one by one, or a required portion of a long decorative sheet may be fed intermittently.

When a decorative sheet is placed within a mold, (i) it is placed by simply heating a mold and carrying out suction by evacuating the mold to give intimate contact, or (ii) it is placed by heating and softening from the image layer side using a heated platen, preliminarily molding the decorative sheet so as to follow the shape of the interior of the mold, and carrying out mold clamping so that there is intimate contact with an inner face of the mold. The heating temperature in (ii) is preferably at least around the glass transition temperature of a substrate film but less than the melting temperature (or melting point), and it is normally a temperature around the glass transition temperature. Around the glass transition temperature means a range of on the order of ±5° C. of the glass transition temperature, and is generally on the order of 70° C. to 130° C. In the case of (ii), for the purpose of putting the decorative sheet into intimate contact with the mold surface, when heating and softening the decorative sheet using a heated platen, suction by evacuating may be carried out.

In the present invention, a preliminarily molded decorative sheet molded product may be placed in a mold.

Step (2) is an injection step in which a molten resin is injected into the cavity (hollow part) and cooled/solidified to thus laminate and integrate a resin molding and a decorative sheet. When the injection resin is a thermoplastic resin, it is put into a fluid state by heating and melting, and when the injection resin is a thermosetting resin, an uncured liquid composition is heated as appropriate and injected in a fluid state, and solidified by cooling. This enables the decorative sheet to integrate with and stick to the resin molding thus formed, thereby giving a decorative molded article. The heating temperature for the injection resin depends on the injection resin, but is preferably on the order of 180° C. to 280° C.

(Injection Resin)

Any injection resin may be used in the decorative molded article as long as it is a thermoplastic resin or thermosetting resin (including a two-component curable resin) that can be injection-molded, and various resins may be used. Examples of such thermoplastic resin materials include a polystyrene-based resin, a polyolefin-based resin, an ABS resin (including a heat-resistant ABS resin), an AS resin, an AN resin, a polyphenylene oxide-based resin, a polycarbonate-based resin, a polyacetal-based resin, an acrylic-based resin, a polyethylene terephthalate-based resin, a polybutylene terephthalate-based resin, a polysulfone-based resin, and a polyphenylene sulfide-based resin. Examples of the thermosetting resin include a two-component reaction-curing type polyurethane-based resin and an epoxy-based resin. These resins may be used singly or as a mixture of two or more types.

In addition to the above steps, it is preferable to have a step of removing from the mold a molding having a resin molding integrated with a decorative sheet.

In accordance with the present invention, there can be provided an actinic radiation-curing type ink composition that can give an image having excellent stretchability and adhesion at high temperature, furthermore having excellent suitability for injection molding (resistance to ink flow) in in-mold molding in particular and, moreover, having suppressed cracking when punching, and to provide an inkjet recording method employing the actinic radiation-curing type ink composition, a decorative sheet, a decorative sheet molded product, a process for producing an in-mold molded article, and an in-mold molded article.

EXAMPLE

The present invention is explained in further detail by reference to Examples and Comparative Examples. However, the present invention should not be construed as being limited to these Examples.

'Parts' described below means 'parts by mass' unless otherwise specified.

The materials used in the Examples and Comparative Examples were as follows.
(Pigment)
IRGALITE BLUE GLVO (cyan pigment, C.I. Pigment Blue 15:4, BASF Japan) CINQUASIA MAGENTA RT-355D (magenta pigment, mixed crystal pigment of C.I. Pigment Violet 19 and C.I. Pigment Red 202, BASF Japan)
NOVOPERM YELLOW H2G (yellow pigment, C.I. Pigment Yellow 120, Clariant)
SPECIAL BLACK 250 (black pigment, C.I. Pigment Black 7, BASF Japan) Tipaque CR60-2 (white pigment, Ishihara Sangyo Kaisha Ltd.)
(Dispersant)
SOLSPERSE 36000 (pigment dispersing agent, The Lubrizol Corporation)
SOLSPERSE 32000 (pigment dispersing agent, The Lubrizol Corporation)
SOLSPERSE 2000 (pigment dispersing agent, The Lubrizol Corporation)
SOLSPERSE 5000 (pigment dispersing agent, The Lubrizol Corporation)
(Monomer/oligomer)
(Component A-1) N-vinyl compound
NVC(N-vinylcaprolactam, BASF Japan)
(Component A-2) Acrylamide derivative
A-2-1 (N-isopropylacrylamide (NIPAM), Kohjin Co., Ltd.)
A-2-2 (acryloylmorpholine (ACMO), Kohjin Co., Ltd.)

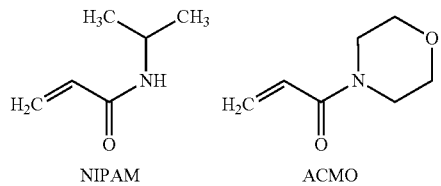

NIPAM  ACMO (Component A-3) Compound represented by Formula (a-3)
EOEOEA (2-(2-ethoxyethoxy)ethyl acrylate, SR256c, Sartomer)
(Component A-4) Other monofunctional radically polymerizable monomer
PEA (phenoxyethyl acrylate, SR339, Sartomer)
IBOA (isobornyl acrylate, SR506, Sartomer)
FA513 (dicyclopentanyl acrylate, Hitachi Chemical Co., Ltd.)
(Component B) Polyfunctional acrylate oligomer having glass transition temperature of no greater than 20° C. and having acrylate equivalent of at least 300 g/eq
B-1 (U200PA, Shin-Nakamura Chemical Co., Ltd., urethane acrylate oligomer having isophorone structure, difunctional, Mw: 2,600, glass transition temperature: −10° C., acrylate equivalent: 1,300 g/eq)
B-2 (Ebecryl 270, Daicel-Cytec Company Ltd., urethane acrylate oligomer, difunctional, Mw: 1,500, glass transition temperature: −27° C., acrylate equivalent: 750 g/eq)
B-3 (UV3200B, The Nippon Synthetic Chemical Industry Co., Ltd., urethane acrylate oligomer, difunctional, Mw: 10,000, glass transition temperature: −8° C., acrylate equivalent: 5,000 g/eq)
B-4 (Ebecryl 884, Daicel-Cytec Company Ltd., polyester acrylate oligomer, difunctional, Mw: 3,000, glass transition temperature: −10° C., acrylate equivalent: 1,500 g/eq)
B-5 (Ebecryl 3708, Daicel-Cytec Company Ltd., polyepoxy acrylate oligomer, difunctional, Mw: 1,500, glass transition temperature: −10° C., acrylate equivalent: 750 g/eq)
B-6 (UV7510B, The Nippon Synthetic Chemical Industry Co., Ltd., urethane acrylate oligomer, trifunctional, Mw: 3,500, glass transition temperature: 17° C., acrylate equivalent: 1,200 g/eq)
B-7 (UV3000B, The Nippon Synthetic Chemical Industry Co., Ltd., urethane acrylate oligomer, difunctional, Mw: 18,000, glass transition temperature: −39° C., acrylate equivalent: 9,000 g/eq)
Ebecryl 1830 (Daicel-Cytec Company Ltd., polyester acrylate oligomer, trifunctional, Mw: 1,500, glass transition temperature: 60° C., acrylate equivalent: 500 g/eq)
Ebecryl 450 (Daicel-Cytec Company Ltd., polyester acrylate oligomer, hexafunctional, Mw: 1,600, glass transition temperature: 17° C., acrylate equivalent: 267 g/eq)
(Component C) Polymerization Initiator
(Component C-1) Thioxanthone Compound
ITX (photopolymerization initiator, isopropylthioxanthone, Shell Chemicals Japan Ltd.)
(Component C-2) Other Polymerization Initiator
Irg 819 (IRGACURE 819 (bis(2,4,6-trimethylbenzoyl)phenylphosphine oxide), bisacylphosphine photopolymerization initiator, BASF Japan)
(Component D) Difunctional Monomer Having a Viscosity at 25° C. Of No Greater than 15 mPa·sec
D-1: VEEA (2-(2-vinyloxy)ethyl) acrylate, Nippon Shokubai Co., Ltd., viscosity at 25° C.: 3.65 mPa·sec)
D-3: SR238 (1,6-hexanediol diacrylate, Sartomer Company Inc., viscosity at 25° C.: 5 to 9 mPa·sec)
D-10: SR508 (dipropylene glycol diacrylate, Sartomer Company Inc., 11 mPa·sec)
(Component E)
Silicone Polymer 4 (polymer number 4 in Table 1-1)
Silicone Polymer 1 (polymer number 1 in Table 1-1)
Silicone Polymer 7 (polymer number 7 in Table 1-1)
Silicone Polymer 10 (polymer number 10 in Table 1-2)
Silicone Polymer 13 (polymer number 13 in Table 1-2)
Silicone Polymer 16 (polymer number 16 in Table 1-2)
(Other Component)
UV12 (polymerization inhibitor, aluminum salt, Kromachem)
MEHQ (polymerization inhibitor, hydroquinone monomethyl ether, Tokyo Chemical Industry Co., Ltd.)
(Preparation of Mill Base (Pigment Dispersing Agent))
<Preparation of Cyan Mill Base (Cyan Pigment Dispersion)>

C pigment (cyan pigment): IRGALITE BLUE GLVO (BASF Japan): 30 parts by mass
PEA: 50 parts by mass
SOLSPERSE 32000: 10 parts by mass
SOLSPERSE 5000: 10 parts by mass The above components were stirred to give a cyan mill base. Preparation of a pigment mill base was carried out by putting it into an M50 disperser motor mill (Eiger Machinery, Inc.) and dispersing using zirconia beads having a diameter of 0.65 mm at a peripheral speed of 9 m/s for 8 hours.

<Preparation of Magenta Mill Base>
M pigment (magenta pigment): CINQUASIA MAGENTA RT-355D (BASF Japan): 30 parts by mass
PEA: 50 parts by mass
SOLSPERSE 32000: 20 parts by mass The above components were stirred to give a magenta mill base. Preparation of a pigment mill base was carried out by putting it into an M50 disperser motor mill (Eiger Machinery, Inc.) and dispersing using zirconia beads having a diameter of 0.65 mm at a peripheral speed of 9 m/s for 8 hours.

<Preparation of Yellow Mill Base>
Y pigment (yellow pigment): NOVOPERM YELLOW H2G (Clariant): 30 parts by mass
PEA: 50 parts by mass
SOLSPERSE 2000: 20 parts by mass The above components were stirred to give a yellow mill base. Preparation of a pigment mill base was carried out by putting it into an M50 disperser motor mill (Eiger Machinery, Inc.) and dispersing using zirconia beads having a diameter of 0.65 mm at a peripheral speed of 9 m/s for 8 hours.

<Preparation of Black Mill Base>
K pigment (black pigment): SPECIAL BLACK 250 (BASF Japan): 30 parts by mass
PEA: 50 parts by mass
SOLSPERSE 32000: 20 parts by mass The above components were stirred to give a black mill base. Preparation of a pigment mill base was carried out by putting it into an M50 disperser motor mill (Eiger Machinery, Inc.) and dispersing using zirconia beads having a diameter of 0.65 mm at a peripheral speed of 9 m/s for 8 hours.

Examples and Comparative Examples

<Preparation of Ink>
Component A, Component B, Component C, Component D, Component E, each of the mill bases, and other additives were mixed according to the formulations (parts by mass) shown in the tables below and stirred at high speed, thus giving ink compositions. In Table 3 to Table 5 below, '–' means that the corresponding component was not added.

<Inkjet Image Recording Method>
Recording was carried out on a recording medium using an inkjet recording system having piezo type inkjet nozzles. The ink supply system comprised a main tank, a supply pipe, an ink supply tank immediately before an inkjet head, a filter, and a piezo type inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 40° C.±2° C. The piezo type inkjet head was driven so as to discharge multisize dots of 1 to 10 pL at a resolution of 4,800×4,800 dpi. The exposure system, the main scanning speed, and the discharge frequency were adjusted so that, after landing, UV light was focused to give an exposure area illumination intensity of 1,200 mW/cm$^2$, and irradiation started 0.1 sec. after the ink composition landed on the recording medium. The exposure time was variable, and exposure energy was applied. The UV lamp employed a UV-LED lamp (manufactured by Panasonic). Here, the dpi referred to in the present invention denotes the number of dots per 2.54 cm.

Since an image was formed by reciprocating the head five times, the ink that had been fired first was irradiated with an exposure corresponding to the five reciprocations. The exposure for one reciprocation was about 300 mJ/cm$^2$, and the total exposure when reciprocated five times was 1,500 mJ/cm$^2$.

(Evaluation Methods)
<Evaluation of Adhesion>

Solid images having an average film thickness of 30 μm were drawn on evaluation substrates using the ink compositions of the Examples and Comparative Examples in accordance with the inkjet recording method, and the ink images were cut to a size of 5 cm×2 cm and subjected to evaluation in accordance with JIS K5600-5-6: adhesion of coating (cross-cut method).

As the evaluation substrate, untreated PET (Toray, Lumirror T60), acrylic (Mitsubishi Rayon Co., Ltd., Acrylite), and polycarbonate (Teijin Chemicals Ltd., Panlite) were used.

The evaluation criteria were as follows. The JIS criteria use an evaluation according to six grades of 0 to 5, with 0 being the best.
5: evaluation of 0 by JIS for all three types of substrates
4: evaluation of 1 by JIS for one substrate, evaluation of 0 or 1 for the other two substrates
3: evaluation of 2 by JIS for one substrate, evaluation of 0 to 2 for the other two substrates
2: evaluation of 3 by JIS for one substrate, evaluation of 0 to 2 for the other two substrates
1: evaluation of 3 to 5 by JIS for two or more substrates An evaluation of up to 3 was acceptable in practice; the adhesion was firm, and the ink film did not peel off during molding.

<Evaluation of Stretchability (Measurement of Thermal Stretching Ratio)>

Solid images having an average film thickness of 30 μm were drawn on a transparent substrate (polycarbonate) as a resin sheet using the ink compositions of the Examples and Comparative Examples in accordance with the inkjet recording method, and the ink images were cut to a size of 5 cm×2 cm and subjected to measurement of stretching ratio by pulling using the stretching machine and temperature conditions below.
Equipment used: Tensilon (Shimadzu Corporation)
Conditions: temperature 180° C., pulling speed 50 millimeter/min.

Length at break was measured and the stretching ratio was calculated. The stretching ratio was determined from stretching ratio={(length at break−length before stretching)/length before stretching}×100.

Specifically, when there was break at 10 cm, the stretching ratio was

{(10 cm−5 cm)/5 cm}×100=100%.

The evaluation criteria for thermal stretchability were as follows.
5: stretching ratio of at least 200%
4: stretching ratio of at least 150% but less than 200%
3: stretching ratio of at least 100% but less than 150%
2: stretching ratio of at least 70% but less than 100%
1: stretching ratio of less than 70%

An evaluation of 5 was the best, and an evaluation of 3 or greater was a level that gave no problems in practice.

<Evaluation of Suitability for Punching>

Solid images having an average film thickness of 30 μm were drawn on a transparent substrate (polycarbonate) as a resin sheet using the ink compositions of the Examples and Comparative Examples in accordance with the inkjet recording method, thus producing ink films. A punching test was carried out using an office punch under the conditions below, and the suitability for punching was evaluated by means of examination by eye and by an optical microscope.

Equipment used: office punch (product name DP-23 Blue, MAX Co., Ltd.)

Conditions: ink film was punched at a temperature of 25° C.

The evaluation criteria for suitability for punching were as follows.

5: there was no cracking at all in any part of the image when examined by eye and by optical microscope
4: there were no greater than two parts with cracking in the image when examined by optical microscope, but they were not visible by eye
3: there were at least three parts with cracking in the image when examined by optical microscope, but they were not visible by eye
2: cracking occurred around the punch hole and was visible by eye
1: cracking occurred and spread at least 5 cm from the punch hole An evaluation of 5 was the best, and an evaluation of 3 or greater was a level that gave no problems in practice.

<Evaluation of Resistance to Ink Flow>

Solid images having an average film thickness of 30 μm were drawn on a transparent substrate (polycarbonate) as a resin sheet using the ink compositions of the Examples and Comparative Examples in accordance with the inkjet recording method, thus producing ink films The injection molding machine below was used, a decorative sheet was fixed to an inner wall of a hollow part of a 5.5 cm×5.5 cm mold so that the image layer was on the inside, and an ABS (acrylonitrile/butadiene/styrene) resin at 220° C. was injected via a gate toward the image face of the decorative sheet and molded. The molded article was subjected to evaluation of resistance to ink flow occurring during the process.

Ink flow is a phenomenon in which, during injection molding, an ink image film of a decorative sheet cannot follow the expansion/contraction of high temperature molten injection resin that has been injected; the ink image becomes missing, and the length of the missing portion is measured. Injection molding equipment used: SG-50, Sumitomo Heavy Industries, Ltd.

The evaluation criteria for resistance to ink flow were as follows.

5: there was no ink flow at all.
4: the image density of the image layer at the injection part decreased.
3: 0.1 to 0.5 cm of ink flow occurred in the image layer at the injection part.
2: 0.5 to 5 cm of ink flow occurred in the image layer at the injection part.
1: at least 5 cm of ink flow occurred in the image layer at the injection part.

An evaluation of 5 was the best, and an evaluation of 3 or greater was a level that gave no problems in practice.

<Ink Viscosity>

An ink was stored in a constant-temperature chamber at 25° C. for 1 hour, and measurement was then carried out using a model E viscometer.

The ink viscosity should be a value that is suitable for inkjet and should not be too high or too low, and the evaluation was therefore carried out as follows.

5: at least 18 mPa·sec but no greater than 30 mPa·sec
4: at least 15 mPa·sec but less than 18 mPa·sec, or greater than 30 mPa·sec but no greater than 32.5 mPa·sec
3: at least 13 mPa·sec but less than 15 mPa·sec, or greater than 32.5 mPa·sec but no greater than 35 mPa·sec
2: at least 11 mPa but less than 13 mPa·sec, or greater than 35 mPa·sec but no greater than 37 mPa·sec
1: less than 11 mPa·sec or greater than 37 mPa·sec An evaluation of 5 was the best, and an evaluation of 3 or greater was a level that gave no problems in practice.

TABLE 3

| | Example | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| NVC | 20 | 20 | 20 | 20 | 20 | 20 | 20 | 18 | 24 | 30 | 40 | 24 | 24 | 24 | 24 | 24 | 24 | 24 | 24 |
| A-2-1 | 53 | 50 | 28 | 15 | 10 | 5 | 1 | 15 | 15 | 15 | 15 | 15 | 15 | 15 | 15 | 15 | 15 | 15 | 15 |
| B-1 | 5 | 5 | 5 | 5 | 5 | 5 | 5 | 5 | 5 | 5 | 5 | 5 | 0.1 | 1 | 8 | 10 | 5 | 5 | 5 |
| EOEOEA | 2 | 5 | 5 | 5 | 5 | 5 | 5 | 5 | 5 | 5 | 5 | 5 | 5 | 5 | 5 | 5 | 5 | 5 | 5 |
| IBOA | 3 | 3 | 5 | 5 | 5 | 5 | 5 | 5 | 5 | 5 | 5 | 14 | 14 | 14 | 14 | 14 | 14 | 14 | 14 |
| PEA | — | — | 20 | 33 | 38 | 43 | 47 | 35 | 29 | 23 | 13 | 20 | 24.9 | 24 | 17 | 15 | 12 | 18 | 18 |
| Cyan pigment dispersion | 9 | 9 | 9 | 9 | 9 | 9 | 9 | 9 | 9 | 9 | 9 | 9 | 9 | 9 | 9 | 9 | — | — | — |
| Magenta pigment dispersion | — | — | — | — | — | — | — | — | — | — | — | — | — | — | — | — | 16 | — | — |
| Yellow pigment dispersion | — | — | — | — | — | — | — | — | — | — | — | — | — | — | — | — | — | 10 | — |
| Black pigment dispersion | — | — | — | — | — | — | — | — | — | — | — | — | — | — | — | — | — | — | 10 |
| Irg 819 | 5 | 5 | 5 | 5 | 5 | 5 | 5 | 5 | 5 | 5 | 5 | 5 | 5 | 5 | 5 | 5 | 5 | 5 | 5 |
| ITX | 1 | 1 | 1 | 1 | 1 | 1 | 1 | 1 | 1 | 1 | 1 | 1 | 1 | 1 | 1 | 1 | 1 | 1 | 1 |
| UV12 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| MEHQ | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

TABLE 3-continued

| | Example | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| D-1 | — | — | — | — | — | — | — | — | — | — | — | — | — | — | — | — | 1 | 1 | 1 |
| Silicone Polymer 4 | 1 | 1 | 1 | 1 | 1 | 1 | 1 | 1 | 1 | 1 | 1 | 1 | 1 | 1 | 1 | 1 | 1 | 1 | 1 |
| Total | 100 | 100 | 100 | 100 | 100 | 100 | 100 | 100 | 100 | 100 | 100 | 100 | 100 | 100 | 100 | 100 | 100 | 100 | 100 |
| Ink flow resistance | 4 | 4 | 4 | 4 | 4 | 4 | 4 | 3 | 4 | 4 | 3 | 4 | 3 | 4 | 4 | 5 | 5 | 5 | 5 |
| Stretchability | 5 | 5 | 5 | 5 | 4 | 3 | 3 | 4 | 5 | 5 | 5 | 5 | 5 | 5 | 4 | 3 | 5 | 5 | 5 |
| Punching suitability | 3 | 3 | 4 | 4 | 4 | 4 | 4 | 4 | 4 | 4 | 3 | 4 | 3 | 4 | 4 | 5 | 5 | 5 | 5 |
| Adhesion | 4 | 4 | 4 | 4 | 4 | 4 | 3 | 3 | 4 | 4 | 4 | 4 | 4 | 4 | 4 | 5 | 5 | 5 | 5 |
| Viscosity | 3 | 4 | 5 | 5 | 5 | 5 | 5 | 5 | 5 | 5 | 4 | 5 | 5 | 4 | 3 | 3 | 5 | 5 | 5 |

TABLE 4

| | Example | | | | | | | | | | | | | | | |
|---|---|---|---|---|---|---|---|---|---|---|---|---|---|---|---|---|
| | 20 | 21 | 22 | 23 | 24 | 25 | 26 | 27 | 28 | 29 | 30 | 31 | 32 | 33 | 34 | 35 |
| NVC | 24 | 24 | 24 | 24 | 24 | 24 | 24 | 24 | 24 | 24 | 24 | 24 | 24 | 24 | 24 | 24 |
| A-2-1 | 15 | 15 | 15 | 15 | 15 | 15 | 15 | — | 30 | 15 | 15 | 15 | 15 | 15 | 15 | 15 |
| A-2-2 | — | — | — | — | — | — | — | 15 | — | — | — | — | — | — | — | — |
| B-1 | 5 | 5 | 5 | 5 | 5 | 5 | 5 | 5 | 1 | — | — | — | — | — | — | 5 |
| B-2 | — | — | — | — | — | — | — | — | — | 5 | — | — | — | — | — | — |
| B-3 | — | — | — | — | — | — | — | — | — | — | 5 | — | — | — | — | — |
| B-4 | — | — | — | — | — | — | — | — | — | — | — | 5 | — | — | — | — |
| B-5 | — | — | — | — | — | — | — | — | — | — | — | — | 5 | — | — | — |
| B-6 | — | — | — | — | — | — | — | — | — | — | — | — | — | 5 | — | — |
| B-7 | — | — | — | — | — | — | — | — | — | — | — | — | — | — | 5 | — |
| EOEOEA | 5 | 5 | 5 | 5 | 5 | 5 | 5 | 5 | 5 | 5 | 5 | 5 | 5 | 5 | 5 | 5 |
| IBOA | 14 | 14 | 14 | 14 | 14 | 14 | 14 | 14 | 14 | 14 | 14 | 14 | 14 | 14 | 14 | 14 |
| PEA | 19.9 | 19 | 18 | 15 | 10 | 19 | 20 | 19 | 8 | 19 | 19 | 19 | 19 | 19 | 19 | 19 |
| Cyan pigment dispersion | 9 | 9 | 9 | 9 | 9 | 9 | 9 | 9 | 9 | 9 | 9 | 9 | 9 | 9 | 9 | 9 |
| Irg 819 | 5 | 5 | 5 | 5 | 5 | 5 | 5 | 5 | 5 | 5 | 5 | 5 | 5 | 5 | 5 | 5 |
| ITX | 1 | 1 | 1 | 1 | 1 | 1 | 1 | 1 | 1 | 1 | 1 | 1 | 1 | 1 | 1 | 1 |
| UV12 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| MEHQ | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| D-1 | 0.1 | 1 | 2 | 5 | 10 | — | 1 | 1 | 1 | 1 | 1 | 1 | 1 | 1 | 1 | — |
| D-3 | — | — | — | — | — | — | — | — | — | — | — | — | — | — | — | — |
| D-10 | — | — | — | — | — | 1 | — | — | — | — | — | — | — | — | — | 1 |
| Silicone Polymer 4 | 1 | 1 | 1 | 1 | 1 | 1 | — | 1 | 1 | 1 | 1 | 1 | 1 | 1 | 1 | 1 |
| Silicone Polymer 1 | — | — | — | — | — | — | — | — | — | — | — | — | — | — | — | — |
| Silicone Polymer 7 | — | — | — | — | — | — | — | — | — | — | — | — | — | — | — | — |
| Silicone Polymer 10 | — | — | — | — | — | — | — | — | — | — | — | — | — | — | — | — |
| Silicone Polymer 13 | — | — | — | — | — | — | — | — | — | — | — | — | — | — | — | — |
| Silicone Polymer 16 | — | — | — | — | — | — | — | — | — | — | — | — | — | — | — | — |
| Total | 100 | 100 | 100 | 100 | 100 | 100 | 100 | 100 | 100 | 100 | 100 | 100 | 100 | 100 | 100 | 100 |
| Ink flow resistance | 4 | 5 | 5 | 5 | 5 | 5 | 5 | 5 | 4 | 5 | 5 | 5 | 5 | 5 | 4 | 5 |
| Stretchability | 5 | 5 | 5 | 4 | 3 | 5 | 5 | 5 | 5 | 4 | 5 | 4 | 4 | 4 | 5 | 5 |
| Punching suitability | 4 | 5 | 5 | 5 | 5 | 5 | 5 | 3 | 5 | 5 | 5 | 5 | 5 | 5 | 5 | 5 |
| Adhesion | 4 | 5 | 5 | 5 | 5 | 4 | 4 | 5 | 4 | 5 | 5 | 4 | 4 | 4 | 5 | 5 |
| Viscosity | 5 | 5 | 5 | 5 | 5 | 5 | 5 | 5 | 5 | 5 | 4 | 5 | 5 | 4 | 4 | 5 |

| | Example | | | | | | | | | | |
|---|---|---|---|---|---|---|---|---|---|---|---|
| | 36 | 37 | 38 | 39 | 40 | 41 | 42 | 43 | 44 | 45 | 46 |
| NVC | 24 | 24 | 23 | 23 | 24 | 24 | 24 | 24 | 24 | 24 | 24 |
| A-2-1 | 15 | 15 | 28 | 30 | 53 | 15 | 15 | 15 | 15 | 15 | 53 |
| A-2-2 | — | — | — | — | — | — | — | — | — | — | — |
| B-1 | 5 | 5 | 5 | 5 | 5 | 5 | 5 | 5 | 5 | 5 | 5 |
| B-2 | — | — | — | — | — | — | — | — | — | — | — |
| B-3 | — | — | — | — | — | — | — | — | — | — | — |
| B-4 | — | — | — | — | — | — | — | — | — | — | — |
| B-5 | — | — | — | — | — | — | — | — | — | — | — |
| B-6 | — | — | — | — | — | — | — | — | — | — | — |
| B-7 | — | — | — | — | — | — | — | — | — | — | — |
| EOEOEA | 5 | — | 2 | — | — | 5 | 5 | 5 | 5 | 5 | — |
| IBOA | 14 | 14 | — | — | — | 14 | 14 | 14 | 14 | 14 | — |
| PEA | 19 | 24 | 24 | 24 | — | 19 | 19 | 19 | 19 | 19 | — |
| Cyan pigment | 9 | 9 | 9 | 9 | 9 | 9 | 9 | 9 | 9 | 9 | 9 |

TABLE 4-continued

|  | | | | | | | | | | | |
|---|---|---|---|---|---|---|---|---|---|---|---|
| dispersion | | | | | | | | | | | |
| Irg 819 | 5 | 5 | 5 | 5 | 5 | 5 | 5 | 5 | 5 | 5 | 5 |
| ITX | 1 | 1 | 1 | 1 | 1 | 1 | 1 | 1 | 1 | 1 | 1 |
| UV12 | 0.5 | 0.5 | 0.5 | 0.5 | 0.5 | 0.5 | 0.5 | 0.5 | 0.5 | 0.5 | 0.5 |
| MEHQ | 0.5 | 0.5 | 0.5 | 0.5 | 0.5 | 0.5 | 0.5 | 0.5 | 0.5 | 0.5 | 0.5 |
| D-1 | — | 1 | 1 | 1 | 1 | 1 | 1 | 1 | 1 | 1 | 1 |
| D-3 | — | — | — | — | — | — | — | — | — | — | — |
| D-10 | 1 | — | — | — | — | — | — | — | — | — | — |
| Silicone Polymer 4 | 1 | 1 | 1 | 1 | 1 | — | — | — | — | — | 1 |
| Silicone Polymer 1 | — | — | — | — | — | 1 | — | — | — | — | — |
| Silicone Polymer 7 | — | — | — | — | — | — | 1 | — | — | — | — |
| Silicone Polymer 10 | — | — | — | — | — | — | — | 1 | — | — | — |
| Silicone Polymer 13 | — | — | — | — | — | — | — | — | 1 | — | — |
| Silicone Polymer 16 | — | — | — | — | — | — | — | — | — | 1 | — |
| Total | 100 | 100 | 100 | 100 | 100 | 100 | 100 | 100 | 100 | 100 | 100 |
| Ink flow resistance | 5 | 5 | 4 | 4 | 4 | 5 | 5 | 5 | 5 | 5 | 4 |
| Stretchability | 5 | 5 | 4 | 4 | 5 | 5 | 5 | 5 | 5 | 5 | 5 |
| Punching suitability | 5 | 4 | 3 | 3 | 3 | 5 | 5 | 5 | 5 | 5 | 3 |
| Adhesion | 4 | 5 | 4 | 3 | 4 | 5 | 5 | 5 | 5 | 5 | 4 |
| Viscosity | 5 | 4 | 3 | 3 | 3 | 5 | 5 | 5 | 5 | 5 | 3 |

TABLE 5

| | Comparative Example | | | | |
|---|---|---|---|---|---|
| | 1 | 2 | 3 | 4 | 5 |
| NVC | 15 | 25 | 25 | 24 | 24 |
| A-2-1 | 11 | — | 5 | 15 | 15 |
| B-1 | 5 | 5 | — | — | — |
| Ebecryl 1830 | — | — | — | 5 | — |
| Ebecryl 450 | — | — | — | — | 5 |
| FA513 | — | — | — | 20 | 20 |
| PEA | 52 | 53 | 53 | 19 | 19 |
| Cyan pigment dispersion | 9 | 9 | 9 | 9 | 9 |
| Irg 819 | 5 | 5 | 5 | 5 | 5 |
| ITX | 1 | 1 | 1 | 1 | 1 |
| UV12 | 0.5 | 0.5 | 0.5 | 0.5 | 0.5 |
| MEHQ | 0.5 | 0.5 | 0.5 | 0.5 | 0.5 |
| Silicone Polymer 4 | 1 | 1 | 1 | 1 | 1 |
| Total | 100 | 100 | 100 | 100 | 100 |
| Ink flow resistance | 2 | 2 | 1 | 5 | 5 |
| Stretchability | 2 | 1 | 2 | 3 | 1 |
| Punching suitability | 4 | 4 | 1 | 1 | 4 |
| Adhesion | 2 | 1 | 1 | 1 | 1 |
| Viscosity | 4 | 4 | 5 | 3 | 3 |

What is claimed is:

1. An actinic radiation-curing ink composition comprising:
(Component A) a monofunctional radically polymerizable monomer; and
(Component B) a polyfunctional acrylate oligomer having a glass transition temperature of no greater than 20° C. and having an acrylate equivalent of at least 300 g/eq,
(Component E) a resin having a urethane bond in a main chain and having an ethylenically unsaturated group and a polysiloxane structure in a side chain and/or at a terminal,
Component A comprising (Component A-1) an N-vinyl compound and (Component A-2) an acrylamide derivative,
Component A having a content of at least 70 mass % of the entire ink composition, and
Component A-1 having a content of at least 18 mass % of the entire ink composition,
wherein when the content of Component A-2 in 100 parts by mass of the ink composition is (a-2) (parts by mass) and the content of Component B is (b) (parts by mass), (a-2):(b) mass ratio is 30:1 to 1:1, wherein Component A-1 is a compound represented by Formula (A) below

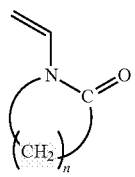

(A)

wherein, in Formula (A), n denotes an integer of 2 to 6,
wherein Component A-2 is a compound represented by Formula (a-2-1) below

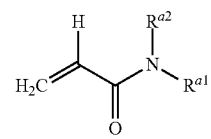

(a-2-1)

wherein, in Formula (a-2-1), $R^{a1}$ and $R^{a2}$ independently denote a hydrogen atom or an alkyl group having 1 to 12 carbons, $R^{a1}$ and $R^{a2}$ may be bonded to form an alkylene group having 4 to 8 carbons, a hydrogen atom contained in the alkyl group or the alkylene group may be replaced by a hydroxy group, a methylene group contained in the alkyl group or the alkylene group may be replaced by an oxygen atom, a sulfur atom, —CO—, or —$NR^{a3}$—, and $R^{a3}$ denotes a hydrogen atom or an alkyl group having 1 to 6 carbons.

2. The actinic radiation-curing ink composition according to claim 1, wherein Component A-2 has a content of 5 to 50 mass % of the entire ink composition.

3. The actinic radiation-curing ink composition according to claim 1, wherein Component B has a content of 0.1 to 10 mass % of the entire ink composition.

4. The actinic radiation-curing ink composition according to claim 1, wherein it comprises (Component C) a polymerization initiator, Component C comprising (Component C-1) a thioxanthone compound.

5. The actinic radiation-curing ink composition according to claim 1, wherein Component B is a difunctional acrylate oligomer.

6. The actinic radiation-curing ink composition according to claim 1, wherein Component B has an isophorone structure.

7. The actinic radiation-curing ink composition according to claim 1, wherein it further comprises (Component D) a difunctional monomer having a viscosity at 25° C. of no greater than 15 mPa·sec.

8. The actinic radiation-curing ink composition according to claim 7, wherein Component D is represented by Formula (d-1) below, A-B-A'      (d-1)

wherein in Formula (d-1), A denotes a group selected from the group consisting of (A-1) to (A-3) below, A' denotes a group selected from the group consisting of (A'-1) to (A'-3) below, and B denotes a divalent linking group represented by Formula (B-1) or (B-2) below,

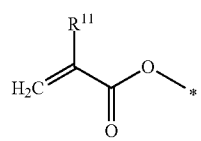
(A-1)

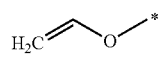
(A-2)

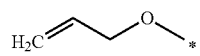
(A-3)

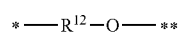
(B-1)

(B-2)

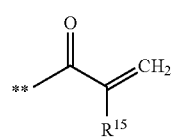
(A'-1)

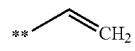
(A'-2)

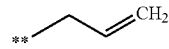
(A'-3)

wherein in Formula (A-1) $R^{11}$ denotes a hydrogen atom or a methyl group, in Formula (B-1) $R^{12}$ denotes a saturated hydrocarbon group having 2 to 12 carbons, in Formula (B-2) one of $R^{13}$ and $R^{14}$ denotes a hydrogen atom, the other denotes a hydrogen atom or a methyl group, and n denotes an integer of 2 to 10, in Formula (A'-1) $R^{15}$ denotes a hydrogen atom or a methyl group, * denotes the position of bonding between A and B, and ** denotes the position of bonding between B and A'.

9. The actinic radiation-curing ink composition according to claim 1, wherein Component A comprises (Component A-3) a compound represented by Formula (a-3) below,

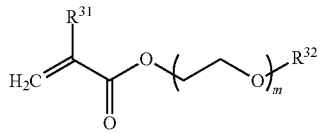
(a-3)

wherein in Formula (a-3), $R^{31}$ denotes a hydrogen atom or a methyl group, $R^{32}$ denotes a methyl group or an ethyl group, and m denotes an integer of 1 to 5.

10. The actinic radiation-curing ink composition according to claim 1, wherein it is for use in inkjet recording.

11. An inkjet recording method comprising:
(a¹) a step of discharging an ink composition onto a recording medium; and
(b¹) a step of irradiating the discharged ink composition with actinic radiation to thus cure the ink composition, the ink composition being the actinic radiation-curing type ink composition according to claim 1.

12. The inkjet recording method according to claim 11, wherein the actinic radiation employs a light-emitting diode as a light source.

13. A decorative sheet comprising a cured image layer of the actinic radiation-curing type ink composition according to claim 1 provided above a resin sheet.

14. A decorative sheet molded product obtained by vacuum forming, pressure forming, or vacuum/pressure forming of the decorative sheet according to claim 13.

15. The decorative sheet molded product according to claim 13, wherein it is further subjected to hole making by means of trimming subsequent to the vacuum forming, pressure forming, or vacuum/pressure forming.

16. A process for producing an in-mold molded article, comprising:
a step of placing the decorative sheet molded product according to claim 14 on an inner wall of a hollow part formed from a plurality of molds; and
a step of injecting a molten resin into the hollow part via a gate.

17. An in-mold molded article obtained by the production process according to claim 16.

18. The actinic radiation-curing ink composition according to claim 1, wherein the Component A-2 is at least one component selected from the group consisting of N, N-dimethylacrylamide, N,N-diethylacrylamide, N-isopropylacrylamide, and acryloylmorpholine.

19. The actinic radiation-curing ink composition according to claim 1, wherein the (a-2):(b) (mass ratio) is 10:1 to 2:1.

20. The actinic radiation-curing ink composition according to claim 2, wherein the Component A-2 has a content of 12 to 25 mass % of the entire ink composition.

* * * * *